(12) United States Patent
Datta et al.

(10) Patent No.: US 8,501,892 B2
(45) Date of Patent: *Aug. 6, 2013

(54) PROPYLENE ETHYLENE POLYMERS AND PRODUCTION PROCESS

(75) Inventors: Sudhin Datta, Houston, TX (US); Bruce A. Harrington, Houston, TX (US); Weiguo Hu, Houston, TX (US); Periagaram S. Ravishankar, Kingwood, TX (US); George Rodriguez, Houston, TX (US)

(73) Assignee: Exxonmobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/219,090

(22) Filed: Aug. 26, 2011

(65) Prior Publication Data

US 2011/0313117 A1  Dec. 22, 2011

Related U.S. Application Data

(60) Division of application No. 11/788,258, filed on Apr. 19, 2007, now Pat. No. 8,026,323, which is a division of application No. 10/474,594, filed as application No. PCT/US02/10515 on Apr. 2, 2002, now Pat. No. 7,232,871, which is a continuation-in-part of application No. 09/346,460, filed on Jul. 1, 1999, now abandoned, which is a continuation-in-part of application No. 09/342,854, filed on Jun. 29, 1999, now Pat. No. 6,642,316, which is a continuation-in-part of application No. 09/108,772, filed on Jul. 2, 1998, now abandoned, which is a continuation-in-part of application No. 09/108,467, filed on Jul. 1, 1998, now abandoned, which is a continuation-in-part of application No. 08/910,001, filed on Aug. 12, 1997, now Pat. No. 6,635,715.

(60) Provisional application No. 60/342,186, filed on Dec. 19, 2001, provisional application No. 60/336,655, filed on Dec. 5, 2001.

(51) Int. Cl.
  *C08F 210/06* (2006.01)
  *C08F 210/02* (2006.01)
  *C08F 210/00* (2006.01)

(52) U.S. Cl.
  USPC ........... 526/351; 526/348; 526/160; 526/170; 526/941; 526/943; 528/396

(58) Field of Classification Search
  USPC .................. 526/348, 351, 160, 170
  See application file for complete search history.

(56) References Cited

U.S. PATENT DOCUMENTS

| | | |
|---|---|---|
| 2,957,512 A | 10/1960 | Wade et al. |
| 3,156,242 A | 11/1964 | Crowe, Jr. |
| 3,262,992 A | 7/1966 | Holzer et al. |
| 3,378,606 A | 4/1968 | Kontos |
| 3,485,706 A | 12/1969 | Evans |
| 3,520,861 A | 7/1970 | Thomson et al. |
| 3,758,656 A | 9/1973 | Shih |
| 3,812,077 A | 5/1974 | Hobbs |
| 3,853,969 A | 12/1974 | Kontos |
| 3,881,489 A | 5/1975 | Hartwell |
| 3,882,197 A | 5/1975 | Fritz et al. |
| 3,888,949 A | 6/1975 | Shih |
| 3,989,867 A | 11/1976 | Sisson |
| 3,998,911 A | 12/1976 | Strametz et al. |
| 4,076,698 A | 2/1978 | Anderson et al. |
| 4,211,852 A | 7/1980 | Matsuda et al. |
| 4,234,298 A | 11/1980 | Spielhoff |
| 4,322,027 A | 3/1982 | Reba |
| 4,330,646 A | 5/1982 | Sakurai et al. |
| 4,381,781 A | 5/1983 | Sciaraffa et al. |
| 4,411,821 A | 10/1983 | Howard, Jr. |
| 4,413,110 A | 11/1983 | Kavesh et al. |
| 4,425,393 A | 1/1984 | Benedyk et al. |
| 4,430,563 A | 2/1984 | Harrington |
| 4,461,872 A | 7/1984 | Su |
| 4,491,652 A | 1/1985 | Matthews et al. |
| 4,540,753 A | 9/1985 | Cozewith et al. |
| 4,542,199 A | 9/1985 | Kaminsky et al. |
| 4,543,399 A | 9/1985 | Jenkins, III et al. |
| 4,544,762 A | 10/1985 | Kaminsky et al. |
| 4,578,414 A | 3/1986 | Sawyer et al. |
| 4,588,790 A | 5/1986 | Jenkins, III et al. |
| 4,599,392 A | 7/1986 | McKinney et al. |
| 4,612,300 A | 9/1986 | Coleman, III |

(Continued)

FOREIGN PATENT DOCUMENTS

| | | |
|---|---|---|
| EP | 0 037 659 | 10/1981 |
| EP | 0 128 046 | 12/1984 |
| EP | 0 178 913 | 4/1986 |
| EP | 0 229 476 | 7/1987 |
| EP | 0 277 003 | 8/1988 |
| EP | 0 277 004 | 8/1988 |
| EP | 0 277 033 | 8/1988 |
| EP | 0 302 424 | 2/1989 |
| EP | 0 369 658 | 5/1990 |
| EP | 0 374 695 | 6/1990 |
| EP | 0 426 637 | 5/1991 |
| EP | 0 427 697 | 5/1991 |
| EP | 0 468 537 | 1/1992 |

(Continued)

OTHER PUBLICATIONS

Abramovitch et al., "*Intramolecular Insertion of Arylsulfonylnitrenes into Aliphatic Side Chains*", Journal of Organic Chemistry, 1977, vol. 42, No. 17, pp. 2920-2926.

(Continued)

*Primary Examiner* — Rip A. Lee

(57) ABSTRACT

Ethylene propylene copolymers, substantially free of diene, are described. The copolymers will have a uniform distribution of both tacticity and comonomer between copolymer chains. Further, the copolymers will exhibit a statistically insignificant intramolecular difference of tacticity. The copolymers are made in the presence of a metallocene catalyst.

16 Claims, 3 Drawing Sheets

(56) References Cited

U.S. PATENT DOCUMENTS

| | | |
|---|---|---|
| 4,644,045 A | 2/1987 | Fowells |
| 4,663,220 A | 5/1987 | Wisneski et al. |
| 4,668,566 A | 5/1987 | Braun |
| 4,668,753 A | 5/1987 | Kashiwa et al. |
| 4,752,597 A | 6/1988 | Turner |
| 4,758,656 A | 7/1988 | Itoh et al. |
| 4,808,561 A | 2/1989 | Welborn, Jr. |
| 4,830,907 A | 5/1989 | Sawyer et al. |
| 4,842,922 A | 6/1989 | Krupp et al. |
| 4,859,757 A | 8/1989 | Pellon et al. |
| 4,871,705 A | 10/1989 | Hoel |
| 4,874,880 A | 10/1989 | Miya et al. |
| 4,879,170 A | 11/1989 | Radwanski et al. |
| 4,897,455 A | 1/1990 | Welborn, Jr. |
| 4,909,975 A | 3/1990 | Sawyer et al. |
| 4,912,075 A | 3/1990 | Chang |
| 4,937,217 A | 6/1990 | Chang |
| 4,937,301 A | 6/1990 | Chang |
| 4,939,016 A | 7/1990 | Radwanski et al. |
| 4,940,464 A | 7/1990 | Van Gompel et al. |
| 4,960,878 A | 10/1990 | Crapo et al. |
| 4,988,781 A | 1/1991 | McKinney et al. |
| 5,008,228 A | 4/1991 | Chang |
| 5,015,749 A | 5/1991 | Schmidt et al. |
| 5,017,714 A | 5/1991 | Welborn, Jr. |
| 5,028,670 A | 7/1991 | Chinh et al. |
| 5,032,562 A | 7/1991 | Lo et al. |
| 5,037,416 A | 8/1991 | Allen et al. |
| 5,041,583 A | 8/1991 | Sangokoya |
| 5,041,584 A | 8/1991 | Crapo et al. |
| 5,041,585 A | 8/1991 | Deavenport et al. |
| 5,044,438 A | 9/1991 | Young |
| 5,057,475 A | 10/1991 | Canich et al. |
| 5,064,802 A | 11/1991 | Stevens et al. |
| 5,068,141 A | 11/1991 | Kubo et al. |
| 5,081,322 A | 1/1992 | Winter et al. |
| 5,085,654 A | 2/1992 | Buell |
| 5,086,025 A | 2/1992 | Chang |
| 5,093,415 A | 3/1992 | Brady, III et al. |
| 5,096,867 A | 3/1992 | Canich |
| 5,106,804 A | 4/1992 | Bailly et al. |
| 5,108,820 A | 4/1992 | Kaneko et al. |
| 5,112,686 A | 5/1992 | Krupp et al. |
| 5,115,027 A | 5/1992 | Ogawa et al. |
| 5,120,867 A | 6/1992 | Welborn, Jr. |
| 5,132,262 A | 7/1992 | Rieger et al. |
| 5,132,380 A | 7/1992 | Stevens et al. |
| 5,134,209 A | 7/1992 | Job et al. |
| 5,147,949 A | 9/1992 | Chang |
| 5,153,157 A | 10/1992 | Hlatky et al. |
| 5,198,401 A | 3/1993 | Turner et al. |
| 5,218,071 A | 6/1993 | Tsutsui et al. |
| 5,229,478 A | 7/1993 | Floyd et al. |
| 5,238,892 A | 8/1993 | Chang |
| 5,243,001 A | 9/1993 | Winter et al. |
| 5,272,236 A | 12/1993 | Lai et al. |
| 5,278,119 A | 1/1994 | Turner et al. |
| 5,278,264 A | 1/1994 | Spaleck et al. |
| 5,278,272 A | 1/1994 | Lai et al. |
| 5,280,074 A | 1/1994 | Schreck et al. |
| 5,296,433 A | 3/1994 | Siedle et al. |
| 5,296,434 A | 3/1994 | Karl et al. |
| 5,304,614 A | 4/1994 | Winter et al. |
| 5,321,106 A | 6/1994 | LaPointe |
| 5,322,728 A | 6/1994 | Davey et al. |
| 5,322,902 A | 6/1994 | Schreck et al. |
| 5,324,800 A | 6/1994 | Welborn, Jr. et al. |
| 5,331,054 A | 7/1994 | Fujita et al. |
| 5,336,552 A | 8/1994 | Strack et al. |
| 5,350,723 A | 9/1994 | Neithamer et al. |
| 5,352,749 A | 10/1994 | DeChellis et al. |
| 5,358,792 A | 10/1994 | Mehta et al. |
| 5,380,810 A | 1/1995 | Lai et al. |
| 5,382,400 A | 1/1995 | Pike et al. |
| 5,384,373 A | 1/1995 | McKinney et al. |
| 5,387,568 A | 2/1995 | Ewen et al. |
| 5,391,629 A | 2/1995 | Turner et al. |
| 5,405,922 A | 4/1995 | DeChellis et al. |
| 5,408,017 A | 4/1995 | Turner et al. |
| 5,412,020 A | 5/1995 | Yamamoto et al. |
| 5,416,178 A | 5/1995 | Winter et al. |
| 5,427,991 A | 6/1995 | Turner |
| 5,436,304 A | 7/1995 | Griffin et al. |
| 5,451,639 A | 9/1995 | Marczinke et al. |
| 5,453,471 A | 9/1995 | Bernier et al. |
| 5,455,305 A | 10/1995 | Galambos |
| 5,461,113 A | 10/1995 | Marczinke et al. |
| 5,461,123 A | 10/1995 | Song et al. |
| 5,462,999 A | 10/1995 | Griffin et al. |
| 5,472,775 A | 12/1995 | Obijeski et al. |
| 5,473,028 A | 12/1995 | Nowlin et al. |
| 5,504,049 A | 4/1996 | Crowther et al. |
| 5,504,172 A | 4/1996 | Imuta et al. |
| 5,516,848 A | 5/1996 | Canich et al. |
| 5,516,866 A | 5/1996 | Resconi et al. |
| 5,539,056 A | 7/1996 | Yang et al. |
| 5,541,270 A | 7/1996 | Chinh et al. |
| 5,556,238 A | 9/1996 | Chinh |
| 5,556,928 A | 9/1996 | Devore et al. |
| 5,576,259 A | 11/1996 | Hasegawa et al. |
| 5,585,448 A | 12/1996 | Resconi et al. |
| 5,594,080 A | 1/1997 | Waymouth et al. |
| 5,599,761 A | 2/1997 | Turner |
| 5,608,019 A | 3/1997 | Cheruvu et al. |
| 5,616,661 A | 4/1997 | Eisinger et al. |
| 5,616,664 A | 4/1997 | Timmers et al. |
| 5,618,895 A | 4/1997 | Kerth et al. |
| 5,621,046 A | 4/1997 | Iwanami et al. |
| 5,621,127 A | 4/1997 | Langhauser et al. |
| 5,625,087 A | 4/1997 | Devore et al. |
| 5,637,660 A | 6/1997 | Nagy et al. |
| 5,637,665 A | 6/1997 | Sustic et al. |
| 5,641,828 A | 6/1997 | Sadatoshi et al. |
| 5,645,542 A | 7/1997 | Anjur et al. |
| 5,656,374 A | 8/1997 | Marzola et al. |
| 5,658,997 A | 8/1997 | Fukuoka et al. |
| 5,685,128 A | 11/1997 | Chum et al. |
| 5,686,533 A | 11/1997 | Gahleitner et al. |
| 5,700,896 A | 12/1997 | Dolle et al. |
| 5,703,187 A | 12/1997 | Timmers |
| 5,703,197 A | 12/1997 | Gordon et al. |
| 5,703,257 A | 12/1997 | Rosen et al. |
| 5,710,223 A | 1/1998 | Fukuoka et al. |
| 5,710,224 A | 1/1998 | Alt et al. |
| 5,721,185 A | 2/1998 | LaPointe et al. |
| 5,728,855 A | 3/1998 | Smith et al. |
| 5,731,253 A | 3/1998 | Sangokoya |
| 5,747,621 A | 5/1998 | Resconi et al. |
| 5,753,773 A | 5/1998 | Langhauser et al. |
| 5,760,141 A | 6/1998 | Watanabe et al. |
| 5,763,534 A | 6/1998 | Srinivasan et al. |
| 5,767,208 A | 6/1998 | Turner et al. |
| 5,840,389 A | 11/1998 | Asanuma et al. |
| 5,840,808 A | 11/1998 | Sugimura et al. |
| 5,844,045 A | 12/1998 | Kolthammer et al. |
| 5,869,575 A | 2/1999 | Kolthammer et al. |
| 5,869,584 A | 2/1999 | Winter et al. |
| 5,874,505 A | 2/1999 | Saito et al. |
| 5,883,188 A | 3/1999 | Hwang et al. |
| 5,883,204 A | 3/1999 | Spencer et al. |
| 5,891,976 A | 4/1999 | Costa et al. |
| 5,907,021 A | 5/1999 | Turner et al. |
| 5,910,224 A | 6/1999 | Morman |
| 5,912,302 A | 6/1999 | Gadkari et al. |
| 5,919,983 A | 7/1999 | Rosen et al. |
| 5,922,822 A | 7/1999 | Wilson et al. |
| 5,929,147 A | 7/1999 | Pierick et al. |
| 5,936,053 A | 8/1999 | Fukuoka et al. |
| 5,945,496 A | 8/1999 | Resconi et al. |
| 5,959,046 A | 9/1999 | Imuta et al. |
| 5,962,714 A | 10/1999 | McCullough et al. |
| 5,965,677 A | 10/1999 | Stephan et al. |
| 5,965,756 A | 10/1999 | McAdon et al. |
| 5,972,822 A | 10/1999 | Timmers et al. |

| | | | |
|---|---|---|---|
| 5,977,251 A | 11/1999 | Kao et al. | |
| 5,994,482 A | 11/1999 | Georgellis et al. | |
| 5,998,039 A | 12/1999 | Tanizaki et al. | |
| 6,001,933 A | 12/1999 | Tsuruoka et al. | |
| 6,005,049 A | 12/1999 | Rebhan et al. | |
| 6,013,819 A | 1/2000 | Stevens et al. | |
| 6,015,868 A | 1/2000 | Nickias et al. | |
| 6,034,021 A | 3/2000 | Wilson et al. | |
| 6,034,240 A | 3/2000 | La Pointe | |
| 6,037,417 A | 3/2000 | Nguyen et al. | |
| 6,043,363 A | 3/2000 | LaPointe et al. | |
| 6,048,950 A | 4/2000 | Dolle et al. | |
| 6,074,977 A | 6/2000 | Rosen et al. | |
| 6,103,657 A | 8/2000 | Murray | |
| 6,111,046 A | 8/2000 | Resconi et al. | |
| 6,117,962 A | 9/2000 | Weng et al. | |
| 6,140,442 A | 10/2000 | Knight et al. | |
| 6,150,297 A | 11/2000 | Campbell, Jr. et al. | |
| 6,153,702 A | 11/2000 | Somers | |
| 6,153,703 A | 11/2000 | Lustiger et al. | |
| 6,156,844 A | 12/2000 | Hashimoto et al. | |
| 6,156,846 A | 12/2000 | Tsuruoka et al. | |
| 6,162,887 A | 12/2000 | Yamada et al. | |
| 6,169,151 B1 | 1/2001 | Waymouth et al. | |
| 6,176,952 B1 | 1/2001 | Maugans et al. | |
| 6,190,768 B1 | 2/2001 | Turley et al. | |
| 6,197,886 B1 | 3/2001 | Chatterjee et al. | |
| 6,207,756 B1 | 3/2001 | Datta et al. | |
| 6,211,300 B1 | 4/2001 | Terano et al. | |
| 6,225,243 B1 | 5/2001 | Austin | |
| 6,245,856 B1 | 6/2001 | Kaufman et al. | |
| 6,248,829 B1 | 6/2001 | Fischer et al. | |
| 6,251,997 B1 | 6/2001 | Imai et al. | |
| 6,265,513 B1 | 7/2001 | Murray et al. | |
| 6,268,063 B1 | 7/2001 | Kaminaka et al. | |
| 6,268,444 B1 | 7/2001 | Klosin et al. | |
| 6,268,447 B1 | 7/2001 | Murray et al. | |
| 6,274,678 B1 | 8/2001 | Shinozaki et al. | |
| 6,284,857 B1 | 9/2001 | Shinozaki et al. | |
| 6,291,609 B1 | 9/2001 | Crowther et al. | |
| 6,300,433 B1 | 10/2001 | Rodriguez et al. | |
| 6,303,719 B1 | 10/2001 | Murray et al. | |
| 6,306,973 B1 | 10/2001 | Takaoka et al. | |
| 6,313,226 B1 | 11/2001 | Yasaka et al. | |
| 6,319,991 B1 | 11/2001 | Okayama et al. | |
| 6,320,002 B1 | 11/2001 | Murray et al. | |
| 6,320,005 B1 | 11/2001 | Murray | |
| 6,320,009 B1 | 11/2001 | Nakano et al. | |
| 6,323,389 B1 | 11/2001 | Thomas et al. | |
| 6,326,432 B1 | 12/2001 | Fujita et al. | |
| 6,340,730 B1 | 1/2002 | Murray et al. | |
| 6,342,564 B1 | 1/2002 | Pitkanen et al. | |
| 6,342,565 B1 | 1/2002 | Cheng et al. | |
| 6,342,566 B2 | 1/2002 | Burkhardt et al. | |
| 6,344,530 B2 | 2/2002 | Sugano et al. | |
| 6,355,725 B2 | 3/2002 | Terano et al. | |
| 6,372,847 B1 | 4/2002 | Wouters | |
| 6,388,040 B1 | 5/2002 | Fujita et al. | |
| 6,403,708 B2 | 6/2002 | Moriya et al. | |
| 6,410,662 B1 | 6/2002 | Ushioda et al. | |
| 6,423,782 B1 | 7/2002 | Yukimasa et al. | |
| 6,444,606 B1 | 9/2002 | Bingel et al. | |
| 6,448,341 B1 | 9/2002 | Kolthammer et al. | |
| 6,515,155 B1 | 2/2003 | Klosin et al. | |
| 6,525,157 B2 | 2/2003 | Cozewith et al. | |
| 6,552,149 B2 | 4/2003 | Alastalo et al. | |
| 6,635,597 B1 | 10/2003 | Datta et al. | |
| 6,635,715 B1 | 10/2003 | Cozewith et al. | |
| 6,642,316 B1 | 11/2003 | Datta et al. | |
| 6,867,260 B2 | 3/2005 | Datta et al. | |
| 6,921,794 B2 | 7/2005 | Cozewith et al. | |
| 6,927,258 B2 | 8/2005 | Datta et al. | |
| 7,135,528 B2 | 11/2006 | Datta et al. | |
| 2001/0021732 A1 | 9/2001 | Terano et al. | |
| 2001/0034411 A1 | 10/2001 | Burkhardt et al. | |
| 2001/0034426 A1 | 10/2001 | Waymouth et al. | |
| 2001/0039314 A1 | 11/2001 | Mehta et al. | |
| 2002/0004575 A1 | 1/2002 | Cozewith et al. | |
| 2002/0006993 A1 | 1/2002 | Shinozaki et al. | |
| 2002/0019507 A1 | 2/2002 | Karandinos et al. | |
| 2002/0035210 A1 | 3/2002 | Silvestri et al. | |
| 2002/0062011 A1 | 5/2002 | Campbell, Jr. et al. | |
| 2002/0137845 A1 | 9/2002 | Boussie et al. | |
| 2002/0142912 A1 | 10/2002 | Boussie et al. | |
| 2002/0147288 A1 | 10/2002 | Boussie et al. | |
| 2002/0151662 A1 | 10/2002 | Campbell, Jr. et al. | |
| 2002/0156279 A1 | 10/2002 | Boussie et al. | |
| 2002/0165329 A1 | 11/2002 | Klosin et al. | |
| 2002/0173419 A1 | 11/2002 | Boussie et al. | |
| 2002/0177711 A1 | 11/2002 | LaPointe et al. | |
| 2003/0004286 A1 | 1/2003 | Klosin et al. | |
| 2004/0014896 A1 | 1/2004 | Datta et al. | |
| 2004/0116609 A1 | 6/2004 | Datta et al. | |
| 2004/0236026 A1 | 11/2004 | Datta et al. | |
| 2004/0236042 A1 | 11/2004 | Datta et al. | |
| 2005/0043489 A1 | 2/2005 | Datta et al. | |
| 2005/0113522 A1 | 5/2005 | Datta et al. | |
| 2005/0131150 A1 | 6/2005 | Dutta et al. | |
| 2005/0131155 A1 | 6/2005 | Cozewith et al. | |
| 2005/0131157 A1 | 6/2005 | Datta et al. | |
| 2005/0137343 A1 | 6/2005 | Datta et al. | |
| 2005/0159553 A1 | 7/2005 | Cozewith et al. | |
| 2005/0171285 A1 | 8/2005 | Cozewith et al. | |
| 2005/0197461 A1 | 9/2005 | Datta et al. | |
| 2005/0203252 A1 | 9/2005 | Datta et al. | |
| 2005/0209405 A1 | 9/2005 | Datta et al. | |
| 2005/0209406 A1 | 9/2005 | Datta et al. | |
| 2005/0209407 A1 | 9/2005 | Datta et al. | |
| 2005/0282963 A1 | 12/2005 | Datta et al. | |
| 2005/0282964 A1 | 12/2005 | Datta et al. | |
| 2005/0288444 A1 | 12/2005 | Datta et al. | |
| 2006/0004145 A1 | 1/2006 | Datta et al. | |
| 2006/0004146 A1 | 1/2006 | Datta et al. | |
| 2006/0025531 A1 | 2/2006 | Datta et al. | |

FOREIGN PATENT DOCUMENTS

| | | |
|---|---|---|
| EP | 0 468 651 | 1/1992 |
| EP | 0 480 190 | 4/1992 |
| EP | 0 495 375 | 7/1992 |
| EP | 0 496 260 | 7/1992 |
| EP | 0 514 828 | 11/1992 |
| EP | 0 515 203 | 11/1992 |
| EP | 0 520 732 | 12/1992 |
| EP | 0 538 749 | 4/1993 |
| EP | 0 546 690 | 6/1993 |
| EP | 0 550 214 | 7/1993 |
| EP | 0 573 403 | 12/1993 |
| EP | 0 582 194 | 2/1994 |
| EP | 0 593 083 | 4/1994 |
| EP | 0 628 343 | 12/1994 |
| EP | 0 629 631 | 12/1994 |
| EP | 0 629 632 | 12/1994 |
| EP | 0 646 624 | 4/1995 |
| EP | 0 651 012 | 5/1995 |
| EP | 0 659 773 | 6/1995 |
| EP | 0 663 422 | 7/1995 |
| EP | 0 676 421 | 10/1995 |
| EP | 0 683 176 | 11/1995 |
| EP | 0 692 500 | 1/1996 |
| EP | 0 695 765 | 2/1996 |
| EP | 0 697 420 | 2/1996 |
| EP | 0 699 213 | 3/1996 |
| EP | 0 716 121 | 6/1996 |
| EP | 0 721 798 | 7/1996 |
| EP | 0 728 150 | 8/1996 |
| EP | 0 728 151 | 8/1996 |
| EP | 0 728 771 | 8/1996 |
| EP | 0 728 772 | 8/1996 |
| EP | 0 735 058 | 10/1996 |
| EP | 0 748 846 | 12/1996 |
| EP | 0 780 404 | 6/1997 |
| EP | 0 796 884 | 9/1997 |
| EP | 0 844 280 | 5/1998 |
| EP | 0 890 584 | 1/1999 |
| EP | 0 949 278 | 10/1999 |
| EP | 0 949 279 | 10/1999 |
| EP | 1 002 809 | 5/2000 |
| EP | 1 017 729 | 7/2000 |

| | | |
|---|---|---|
| EP | 1 063 244 | 12/2000 |
| GB | 1 342 647 | 1/1974 |
| JP | 62-119212 | 5/1987 |
| JP | 09-012635 | 1/1997 |
| WO | 87/02991 | 5/1987 |
| WO | 88/05792 | 8/1988 |
| WO | 88/05793 | 8/1988 |
| WO | 90/01521 | 2/1990 |
| WO | 90/07526 | 7/1990 |
| WO | 92/00333 | 1/1992 |
| WO | 93/06169 | 4/1993 |
| WO | 93/11171 | 6/1993 |
| WO | 93/18106 | 9/1993 |
| WO | 93/19104 | 9/1993 |
| WO | 93/21238 | 10/1993 |
| WO | 93/21242 | 10/1993 |
| WO | 93/25590 | 12/1993 |
| WO | 94/00500 | 1/1994 |
| WO | 94/03506 | 2/1994 |
| WO | 94/25495 | 11/1994 |
| WO | 94/25497 | 11/1994 |
| WO | 94/26793 | 11/1994 |
| WO | 94/28032 | 12/1994 |
| WO | 94/29032 | 12/1994 |
| WO | 95/00526 | 1/1995 |
| WO | 95/07942 | 3/1995 |
| WO | 95/13305 | 5/1995 |
| WO | 95/13306 | 5/1995 |
| WO | 96/00244 | 1/1996 |
| WO | 96/06132 | 2/1996 |
| WO | 96/08519 | 3/1996 |
| WO | 96/13530 | 5/1996 |
| WO | 96/23010 | 8/1996 |
| WO | 96/24623 | 8/1996 |
| WO | 96/28525 | 9/1996 |
| WO | 97/10300 | 3/1997 |
| WO | 97/22635 | 6/1997 |
| WO | 97/22639 | 6/1997 |
| WO | 97/25355 | 7/1997 |
| WO | 97/42241 | 11/1997 |
| WO | 98/39384 | 9/1998 |
| WO | 98/41529 | 9/1998 |
| WO | 98/50392 | 11/1998 |
| WO | 99/01485 | 1/1999 |
| WO | 99/06412 | 2/1999 |
| WO | 99/07788 | 2/1999 |
| WO | 99/14250 | 3/1999 |
| WO | 99/20663 | 4/1999 |
| WO | 99/45042 | 9/1999 |
| WO | 99/45045 | 9/1999 |
| WO | 00/01745 | 1/2000 |
| WO | 00/01766 | 1/2000 |
| WO | WO 00/01745 A1 * | 1/2000 |
| WO | 00/24792 | 5/2000 |
| WO | 00/59661 | 10/2000 |
| WO | 00/69964 | 11/2000 |
| WO | 00/69965 | 11/2000 |
| WO | 01/74910 | 10/2001 |
| WO | 02/38628 | 5/2002 |
| WO | 02/083754 | 10/2002 |

OTHER PUBLICATIONS

Alt et al., "*Effect of the Nature of Metallocene Complexes of Group IV Metals on Their Performance in Catalytic Ethylene and Propylene Polymerization*", Chem. Rev., 2000, vol. 100, pp. 1205-1221.

ASTM D 1646-96a—"*Standard Test Methods for Rubber—Viscosity, Stress Relaxation, and Pre-vulcanization Characteristics (Mooney Viscometer)*," American Society for Testing & Materials, Annual Book of ASTM Standards, 1997, vol. 09.01, 313-322.

ASTM D 3900-95—"*Standard Test Methods for Rubber Raw—Determination of Ethylene Units in EPM (Ethylene-Propylene Copolymers) and EPDM (Ethylene-Propylene-Diene Terpolymers)*," American Society for Testing & Materials, Annual Book of ASTM Standards, 1997, vol. 09.01, 616-624.

Billmeyer Jr., F. W., Textbook of Polymer Chemistry, Interscience Publishers, New York (1957), pp. 221-228.

Billmeyer, "*Morphology and Order in Crystalline Polymers*", Textbook of Polymer Science, 3$^{rd}$ Ed., Wiley Interscience Publication, New York (1984), pp. 288-294.

Brintzinger, Hans H., et al, Angew Chem. Int. Ed. Engl., 1995, 34, pp. 1143-1170.

Bruce et al., "*Effect of Metal on the Stereospecicity of 2-Arylindene Catalysts for Elastomeric Polypropylene*", Journal of the American Chemical Society, 1997, vol. 119, pp. 11174-11182.

Carlson et al., "*Component Relaxation Processes within Elastomeric Polypropylene*", Macromolecules, 1999, vol. 32, pp. 8100-8106.

Carman et al., "*Monomer Sequence Distribution in Ethylene Propylene Elastomers. I. Measurement by Carbon-13 Nuclear Magnetic Resonance Spectroscopy*", Rubber Chemistry and Technology, 1971, vol. 44, pp. 781-804.

Chen et al., "*Cocatalysts for Metal-Catalyzed Olefin Polymerization: Activators, Activation Processes, and Structure—Activity Relationships*", Chemical Review, 2000, vol. 100, pp. 1391-1434.

Cheng, "$^{13}C$ *NMR Analysis of Ethylene-Propylene Rubbers*", Macromolecules, 1984, vol. 17, pp. 1950-1955.

J. Chien, et al., "*Two-State Propagation Mechanism for Propylene Polymerization Catalyzed by rac-[anti-Ethylidene(1-η5-tetramethylcyclo-pentadienyl)(1-η5-indenyl)dimethyltitanium*", Journal of the American Chemical Society, 1991, vol. 113, pp. 8569-8570.

Coates et al., "*Oscillating Stereocontrol: A Strategy for the Synthesis of Thermoplastic Elastomeric Polypropylene*", Science, 1995, vol. 267, pp. 217-219.

Coates, "*Precise Control of Polyolefin Stereochemistry Using Single-Site Metal Catalysts*", Chemical Review, 2000, vol. 100, pp. 1223-1252.

Collette et al., "*Elastomeric Polypropylenes from Alumina-Supported Tetraalkyl Group IVB Catalysts. 1. Synthesis and Properties of High Molecular Weight Stereoblock Homopolymers*", Macromolecules, 1989, vol. 22, pp. 3851-3858.

Datta et al., "*Graft Copolymer Compatibilizers for Blends of Isotactic Polypropylene and Ethene-Propene Copolymers. 2. Functional Polymers Approach*", Macromolecules, 1993, vol. 26, pp. 2064-2076.

European Opposition: Notice of Opposition against EP 1 003 814 BI, filed by Dow Chemical Company, Jul. 2, 2003.

European Opposition: Reply Brief filed in response to Dow Chemical Notice of Opposition, filed by ExxonMobil Chemical Patents, Inc., Jun. 11, 2004.

Experimental Report, pp. 1-6, Mar. 29, 2005, Dow Reproduction of Example 6 of EP 0 629 632 A2.

Fletcher, J. H., Eds. et al., "Nomenclature of Organic Compounds, Principle and Practice," American Chemical Society (1974), Chapters 4-5.

Gauthier et al., "*Elastomeric Poly(propylene): Influence of Catalyst Structure and Polymerization Conditions on Polymer Structure and Properties*", Macromolecules, 1995, vol. 28, pp. 3771-3778.

Hauptman et al., "*Stereoblock Polypropylene: Ligand Effects on the Stereospecificity of 2-Arylindene Zirconocene*", Journal of the American Chemical Society, 1995, vol. 117, pp. 11586-11587.

Hazlitt, Lonnie G., Journal of Applied Polymer Science: Applied Power Symposium, 1990, 45, 25-37.

Herzog et al., "*A New Class of Zirconocene Catalysts for the Syndiospecc Polymerization of Propylene and Its Modification for Varying Polypropylene from Isotactic to Syndiotactic*", Journal of the American Chemical Society, 1996, vol. 118, pp. 11988-11989.

HIPOL, data provided by IDES, Mitsui Chemicals America, Inc. HIPOL™ J700, 1 page (2003).

Hu et al., "*Chain Flips in Polyethylene Crystallites and Fibers Characterized by Dipolar $^{13}C$ NMR*", Macromolecules, 1999, vol. 32, pp. 1611-1619.

Hu et al., "*Elastomeric Polypropylenes from Unbridged (2-Phenylindene)zirconocene Catalysts: Thermal Characterization and Mechanical Properties*", Macromolecules, 1998, vol. 31, pp. 6908-6916.

Hu et al., "*Elastomeric Polypropylenes from Unbridged 2-Phenylindene Zirconocene Catalysts: Temperature Dependence of Crystallinity and Relaxation Properties*", Macromolecules, 1999, 32, pp. 3334-3340.

Ittel et al., "*Late-Metal Catalysts for Ethylene Homo- and Copolymerization*", Chemical Review, 2000, vol. 100, pp. 1169-1203.

JP translation for Application No. S62-119215, entitled "Propylene-Based Random Co-Polymer and Its Usage", Kokai Patent official Gazette, published May 30, 1987.

JP translation for Application No. S62-121707, entitled "Process for Production of α-Olefin Type Random Copolymers", Tsutsui et al., published Jun. 3, 1987.

Kaminsky et al., "Ethylene Propylene Diene Terpolymers Produced with a Homogeneous and Highly Active Zirconium Catalyst", Journal of Polymer Science: Polymer Chemistry, 1985, vol. 23, pp. 2151-2164.

Lambert, Joseph B., et al., J. Chem. Soc., Chem. Commun., 1993, pp. 383-384.

Lambert et al., "Silyl Cations in the Solid and in Solution", Organometallics, 1994, vol. 13, pp. 2430-2443.

Lin et al., "Regioirregular Propene Insertion in Polypropenes Synthesized with Unbridged Bis(2-aryl)indenyl Zirconium Dichloride Catalysts: Implications on Activity", Macromolecules, 1999, vol. 32, pp. 8283-8290.

Mathur, Naresh C. et al., Tetrahedron, 1985, vol. 41, No. 8, 1509-1516.

News Release, Japan Polychem Launches WINTEC Metallocente-Based PP Random Copolymer, Oct. 25, 2001, http://www.m-kagaku.co.jp/english/re1/2001/102501.htm.

Opposition Submission to EP 1 003 814, Mar. 24, 2005.

Otocka, E.P., et al., Macromolecules, Jul.-Aug. 1971, vol. 4, No. 4, pp. 507-514.

Painter et al., entitled "Fundamentals of Polymer Science, An Introductory Text", Second Edition, 1997, Technomic Publishing Company, Pennsylvania, pp. 237-242.

Plastics Edition 8, Thermoplastics and Thermosets, 1986.

Polymer Engineering and Science, vol. 36, No. 21, entitled "Effect of the Crystallinity and Morphology on the Microcellular Foam Structure of Semicrystalline Polymers," Doroudiani et al., pp. 2645-2662, Canada, 1996.

Polyolefins, entitled "High Density Polyethylene", "Linear Low Density Polyethylene/Medium Density Polyethylene", "Low Density Polyethylene", and "Propylene" Mitsui Petrochemical Industries, Ltd., Japan, Mar. 29, 2005.

Polypropylene Handbook, Polymerization, Characterization, Properties, Processing, Applications, Edward P. Moore, Jr., New York, 1996.

Potgieter, A. H., "Propylene/l-Pentene Random Copolymers—Production, Properties and Market Performance Study," Schotland Business Research, Inc., SPO '98, pp. 439-449.

"PRO-FAX Polypropylene a General Product Guide," Himont Canada Inc., pp. 1-10 (publication date unknown, Dow submitted, Himont existed between Nov. 1984 to Apr. 1995).

Product Sample Report for Escorene pp. 4292, Polymer Science Laboratory of the Baytown Polymer Center, Exxon Chemical, May 9, 2000.

Project Report, entitled "Laboratory Studies of the TiCl3-Catalyzed Block Copolymerization of Propylene and Ethylene Using Gas-Phase Spiking and Sequential Monomer Methods", N. M. Golembeski, New Jersey, Sep. 10, 1982.

Randall, James C., JMS-Rev. Macromol. Chem. Phys., 1989, C29(2 & 3), pp. 201-317.

Resconi et al., "Selectivity in Propene Polymerization with Metallocene Catalysts", Chemical Review, 2000, vol. 100, pp. 1253-1345.

Rodriguez, Principles of Polymer Systems, 3rd ed., Hemisphere Pub. Corp. NY, 1989, pp. 155-160.

Alfred Rudin, entitled "The Elements of Polymer Science and Engineering" Second Edition, 1999, Academic Press, San Diego, pp. 384-385.

Scholte et al., "Mark-Houwink Equation and GPC Calibration for Linear Short Chain Branched Polyolefins, Including Polypropylene and Ethylene-Propylene Copolymers", Journal of Applied Polymer Science, 1984, vol. 29, pp. 3763-3782.

Scollard et al., "Living Polymerization of α-Olefins by Chelating Diamide Complexes of Titanium", Journal of the American Chemical Society, 1996, vol. 118, pp. 10008-10009.

Slade Ed., "Gel Permeation Chromatography", Polymer Molecular Weights Part II, Marcel Dekker, Inc., NY, 1975, pp. 287-368.

Soga et al., "Isotactic Polymerization of Propene with (72 -1,1'-Ethylenedi-4,5,6,7-Tetrahydroindenyl)Zirconium Dichloride Combined with Methylaluminoxane", Makromol. Chem., Rapid Commun., 1987, vol. 8, pp. 305-310.

Malcolm P. Stevens, entitled "Polymer Chemistry, An Introduction" Third Edition, 1999, Oxford University Press, New York, pp. 140-141.

The Encyclopedia of Chemical Technology, Kirk-Othmer, Third Edition, John Wiley & Sons, New York, 1981, vol. 16, pp. 415-417.

The Encyclopedia of Chemical Technology, Kirk-Othmer, Third Edition, John Wiley & Sons, New York, 1981, vol. 18, pp. 191-192.

I. Tincul et al., "Impact Fracture Toughness of Propylene/ 1-Pentene Random Copolymers," Proceedings of the American Chemical Society Division of Polymeric Materials: Science and Engineering, 1998, 79, 190-191.

Tsutsui et al., "Propylene Homo- and Copolymerization with Ethylene Using an Ethylenebis(1-Indenyl)Zirconium Dichloride and Methylaluminoxane Catalyst System", Polymer, 1989, vol. 30, No. 7, pp. 1350-1356.

Veghini et al., "Mechanisms of Stereocontrol for Doubly Silylene-Bridged $C_s$- and $C_1$-Symmetric Zirconocene Catalysts for Propylene Polymerization. Synthesis and Molecular Structure of $Li_{2\{}(1,2\text{-}Me_2Si)_2\{C_5H_2\text{-}4\text{-}(1R,2S,5R\text{-}menthyl)\}\{C_5H\text{-}3,5\text{-}(CHMe_2)2)\}]\cdot 3THF$ and $[(1,2\text{-}Me_2Si)_2\{\eta^5\text{-}C_5H_2\text{-}4\text{-}(1R,2S,5R\text{-}menthyl)\}\{\eta^5\text{-}C_5H\text{-}3,5\text{-}(CHMe_2)_2\}]ZrCl_2$", Journal of the American Chemical Society, 1999, vol. 121, pp. 564-573.

Ver Strate et al., "Near Monodisperse Ethylene-Propylene Copolymers by Direct Ziegler-Natta Polymerization. Preparation, Characterization, Properties", Macromolecules, 1988, vol. 21, pp. 3360-3371.

Wang et al., "Neutral Nickel (II)-Based Catalysts for Ethylene Polymerization", Organometallics, 1998, vol. 17, No. 15, pp. 3149-3151.

Wild et al., "Determination of Branching Distributions in Polyethylene and Ethylene Copolymers", Journal of Polymer Science: Polymer Physics Edition, 1982, vol. 20, pp. 441-455.

Younkin et al., "Neutral, Single-Component Nickel (II) Polyolefin Catalysts That Tolerate Heteroatoms", Science, 2000, vol. 287, pp. 460-462.

U.S. Appl. No. 11/297,870, filed Dec. 9, 2005, entitled "Propylene Alpha-Olefin Polymers".

U.S. Appl. No. 11/297,871, filed Dec. 9, 2005, entitled "Process for Producing Propylene Alpha-Olefin Polymers".

U.S. Appl. No. 11/298,143, filed Dec. 9, 2005, entitled "Propylene Olefin Copolymer", Datta et al.

U.S. Appl. No. 11/298,146, filed Dec. 9, 2005, entitled "Elastic Blends Comprising Crystalline Polymer and Crystallizable Polymers of Propylene", Datta et al.

U.S. Appl. No. 11/299,100, filed Dec. 9, 2005, entitled "Propylene Alpha-Olefin Polymer Blends".

U.S. Appl. No. 11/350,459, filed Feb. 9, 2006, entitled "Alpha-Olefin/Propylene Copolymers and Their Use".

U.S. Appl. No. 11/351,186, filed Feb. 9, 2006, entitled "Alpha-Olefin/Propylene Copolymers and Their Use".

U.S. Appl. No. 11/351,187, filed Feb. 9, 2006, entitled "Alpha-Olefin/Propylene Copolymers and Their Use".

U.S. Appl. No. 11/352,558, filed Feb. 13, 2006, entitled "Propylene Olefin Copolymer", Datta et al.

U.S. Appl. No. 11/352,559, filed Feb. 13, 2006, entitled "Elastic Blends Comprising Crystalline Polymer and Crystallizable Polymers of Propylene", Datta et al.

U.S. Appl. No. 11/336,578, filed Jan. 20, 2006, entitled "Blends Made from Propylene Ethylene Polymers".

* cited by examiner

Elasticity vs 500% Tensile Modulus

Variation of Melting Point by DSC with composition (Wt% Ethylene)

Heat of Fusion: Comparison of Copolymers produced with Different NCA's

PROPYLENE ETHYLENE POLYMERS AND PRODUCTION PROCESS

CROSS-REFERENCE TO RELATED APPLICATIONS

This application is a divisional application of and claims priority to U.S. patent application Ser. No. 11/788,258, filed Apr. 19, 2007, now U.S. Pat. No. 8,026,323, which is a divisional of U.S. patent application Ser. No. 10/474,594, filed May 27, 2004, now U.S. Pat. No. 7,232,871, which is a 371 National Stage Application of International Application No. PCT/US02/10515, filed Apr. 2, 2002, which claims the benefit of U.S. Provisional. Application No. 60/342,186, filed Dec. 19, 2001, U.S. Provisional Application No. 60/336,655, filed Dec. 5, 2001, and U.S. application Ser. No. 09/834,256, filed Apr. 12, 2001, now U.S. Pat. No. 6,525,157, which is a continuation-in-part of U.S. patent application Ser. No. 09/346,460, filed Jul. 1, 1999, now abandoned, which is a continuation-in-part of U.S. patent application Ser. No. 09/342,854, filed Jun. 29, 1999, now U.S. Pat. No. 6,642,316, which is a continuation-in-part of U.S. patent application Ser. No. 09/108,772, filed Jul. 2, 1998, now abandoned, which is a continuation-in-part of U.S. patent application Ser. No. 09/108,467, filed Jul. 1, 1998, now abandoned, which is a continuation-in-part of U.S. patent application Ser. No. 08/910,001, filed Aug. 12, 1997, now U.S. Pat. No. 6,635,715, the entire disclosures of which are hereby incorporated herein by reference.

FIELD

Embodiments of the present invention include copolymers of ethylene and propylene, in the substantial absence of dienes. More specifically, the copolymers are made in a process that employs a single reactor, in steady state.

BACKGROUND

Ethylene propylene copolymers made with metallocene catalysts are known. Many such copolymers are intermolecularly heterogeneous in terms of tacticity, composition (weight percent comonomers) or both. Further, such polymers may also, or in the alternative, be compositionally heterogeneous within a polymer chain. Such characteristics may be, but are not always, the result of multiple reactor schemes or sequential addition of polymer.

The elasticity, flexural modulus and tensile strength of such copolymers, when considered in the aggregate, may not reach a satisfactory level for use in commercial elastomeric operation.

U.S. Pat. No. 5,747,621 suggests fractionable reactor blend polypropylenes, directly obtainable from the polymerization reaction of propylene having 30 to 90% by weight of a boiling n-heptane fraction, soluble in xylene at 135° C. In Table 2 of this document, the only fractionation disclosed, each of the solvents appears to be at its boiling point. Further, reference to this table shows that the diethyl-ether fraction has no melting point (amorphous).

In the journal articles *Science*, Vol. 267, pp 217-219 (1995); *Macromolecules*, Vol. 31, pp 6908-6916 (1998); and *Macromolecules*, Vol. 32, pp 8283-8290, pp 3334-3340 and pp 8100-8106, propylene polymers with similar characteristics as those disclosed in the above discussed U.S. Pat. No. 5,747,621 are made and fractionated. The polymers are made with bis(aryl indenyl) or bisindenyl metallocene catalysts. In these journal articles, these polymers are fractionated in boiling ether and heptane, leaving a portion of the polymer insoluble in either. The polypropylenes are stated to be compositionally heterogeneous in terms of tacticity and molecular weight.

U.S. Pat. No. 5,504,172 suggests a propylene elastomer that has properties such that:
(a) the elastomer contains propylene units in an amount of 50 to 95% by mol and ethylene units in an amount of 5 to 50% by mol;
(b) a triad tacticity of three propylene units-chains consisting of head-to-tail bonds, as measured by $^{13}$C NMR, is not less than 90.0%; and
(c) a proportion of inversely inserted propylene units based on the 2,1-insertion of a propylene monomer in all propylene insertions, as measured by $^{13}$C NMR, is not less than 0.5%, and a proportion of inversely inserted propylene units based on the 1,3-insertion of a propylene monomer, as measured by $^{13}$C NMR, is not more than 0.05%.

U.S. Pat. No. 5,391,629 suggests block and tapered copolymers of ethylene with an α-olefin. The copolymers are made by a process of sequentially contacting ethylene with an α-olefin monomer in the presence of an activated cyclopentadienyl catalyst system.

EP 0 374 695 suggests ethylene-propylene copolymers and a process for preparing them. The copolymers have a reactivity ratio product, $r_1 r_2$, between 0.5 and 1.5 and an isotactic index greater than 0 percent. The copolymers are produced in the presence of a homogeneous chiral catalyst and an alumoxane co-catalyst.

There is a commercial need therefore for an ethylene propylene copolymer that will show a melting point and an excellent balance of elasticity, flexural modulus and tensile strength. It would further be desirable if such polymers could be produced at higher polymerization temperatures.

It is known that temperature affects the polymerization involving the stereo regular polymerization of alpha-olefins, in particular propylene. Under similar polymerization conditions the increase in the polymerization temperatures leads to both a drop in molecular weight as well as a loss in the tacticity of the alpha olefin residues along the chain. This effect exists for both the homopolymerization of the 1-olefins as well as copolymerization of 1-olefins with ethylene, or other alpha-olefins. These changes in the characteristic of the polymer are detrimental to certain end uses of the polyolefin. However, there are commercial incentives in raising the polymerization temperature since this improves the throughput of the polymerization reactor. This would necessarily lead to better economics for production for these polymers if physical attributes of the polymer product, such as tacticity and molecular weight, could meet or exceed the properties now achieved at lower temperatures.

SUMMARY

We have discovered that ethylene-propylene copolymers, when produced in the presence of a metallocene catalyst and an activator, in a single steady state reactor, show a surprising and unexpected balance of flexural modulus, tensile strength and elasticity. Moreover, these and other properties of the copolymers show surprising differences relative to conventional polymer blends, such as blends of isotactic polypropylene and ethylene-propylene copolymers.

In one embodiment, the copolymer includes from a lower limit of 5% or 6% or 8% or 10% by weight to an upper limit of 20% or 25% by weight ethylene-derived units, and from a lower limit of 75% or 80% by weight to an upper limit of 95% or 94% or 92% or 90% by weight propylene-derived units, the percentages by weight based on the total weight of propylene- and ethylene-derived units. The copolymer is substantially free of diene-derived units.

In various embodiments, features of the copolymers include some or all of the following characteristics, where ranges from any recited upper limit to any recited lower limit are contemplated:

(i) a melting point ranging from an upper limit of less than 110° C., or less than 90° C., or less than 80° C., or less than 70° C., to a lower limit of greater than 25° C., or greater than 35° C., or greater than 40° C., or greater than 45° C.;

(ii) a relationship of elasticity to 500% tensile modulus such that $$Elasticity \leq 0.935M+12, \text{ or}$$

$$Elasticity \leq 0.935M+6, \text{ or}$$

$$Elasticity \leq 0.935M,$$

where elasticity is in percent and M is the 500% tensile modulus in megapascal (MPa);

(iii) a relationship of flexural modulus to 500% tensile modulus such that $$\text{Flexural Modulus} \leq 4.2e^{0.27M}+50, \text{ or}$$

$$\text{Flexural Modulus} \leq 4.2e^{0.27M}+30, \text{ or}$$

$$\text{Flexural Modulus} \leq 4.2e^{0.27M}+10, \text{ or}$$

$$\text{Flexural Modulus} \leq 4.2e^{0.27M}+2,$$

where flexural modulus is in MPa and M is the 500% tensile modulus in MPa;

(iv) a heat of fusion ranging from a lower limit of greater than 1.0 joule per gram (J/g), or greater than 1.5 J/g, or greater than 4.0 J/g, or greater than 6.0 J/g, or greater than 7.0 J/g, to an upper limit of less than 125 J/g, or less than 100 J/g, or less than 75 J/g, or less than 60 J/g, or less than 50 J/g, or less than 40 J/g, or less than 30 J/g;

(v) a triad tacticity as determined by carbon-13 nuclear magnetic resonance ($^{13}$C NMR) of greater than 75%, or greater than 80%, or greater than 85%, or greater than 90%;

(vi) a tacticity index m/r ranging from a lower limit of 4 or 6 to an upper limit of 8 or 10 or 12;

(vii) a proportion of inversely inserted propylene units based on 2,1 insertion of propylene monomer in all propylene insertions, as measured by $^{13}$C NMR, of greater than 0.5% or greater than 0.6%;

(viii) a proportion of inversely inserted propylene units based on 1,3 insertion of propylene monomer in all propylene insertions, as measured by $^{13}$C NMR, of greater than 0.05%, or greater than 0.06%, or greater than 0.07%, or greater than 0.08%, or greater than 0.085%;

(ix) an intermolecular tacticity such that at least X % by weight of the copolymer is soluble in two adjacent temperature fractions of a thermal fractionation carried out in hexane in 8° C. increments, where X is 75, or 80, or 85, or 90, or 95, or 97, or 99;

(x) a reactivity ratio product $r_1r_2$ of less than 1.5, or less than 1.3, or less than 1.0, or less than 0.8;

(xi) a molecular weight distribution Mw/Mn ranging from a lower limit of 1.5 or 1.8 to an upper limit of 40 or 20 or 10 or 5 or 3;

(xii) a molecular weight of from 15,000-5,000,000;

(xiii) a solid state proton nuclear magnetic resonance ($^1$H NMR) relaxation time of less than 18 milliseconds (ms), or less than 16 ms, or less than 14 ms, or less than 12 ms, or less than 10 ms;

(xiv) an elasticity as defined herein of less than 30%, or less than 20%, or less than 10%, or less than 8%, or less than 5%; and (xv) a 500% tensile modulus of greater than 0.5 MPa, or greater than 0.8 MPa, or greater than 1.0 MPa, or greater than 2.0 MPa.

The copolymer be made in the presence of a bridged metallocene catalyst, in a single steady-state reactor. Thus, in another aspect, the present invention is directed to a process for producing an ethylene-propylene copolymer having some or all of the above-recited characteristics, by reacting ethylene and propylene in a steady-state reactor under reactive conditions and in the presence of a bridged metallocene catalyst.

In another embodiment, the invention comprises a solution polymerization process for making the above described semi-crystalline ethylene propylene copolymers by using particular catalyst and activator combination that lead to similar molecular weights and crystallinity from polymerization at a higher temperature or alternatively higher molecular weight and/or crystallinity when compared to polymerization processes conducted at a lower temperature using previous catalyst and activator combinations. This embodiment involves the use of bulky, non-coordinating activators in conjunction with single sited metallocene catalysts capable of making the polymers described above. In another aspect, this embodiment can additionally operate using a higher concentration of the monomers present in the polymerization reactor during polymerization. The combination of these two components of the invention leads to copolymers which have both a higher molecular weight as well as a higher level of tacticity of the propylene residues. Thus these bulky activator systems and higher monomer concentrations can be used for the polymerization of these copolymers at higher temperatures compared to the polymerization conducted with smaller anions while still generating copolymers which have similar molecular weights and isotactic propylene crystallinity.

DESCRIPTION OF THE DRAWINGS

These and other features, aspects and advantages of embodiments of our invention will become better understood with reference to the following description, appended claims and accompanying drawings, in which:

DESCRIPTION

Figure 1:
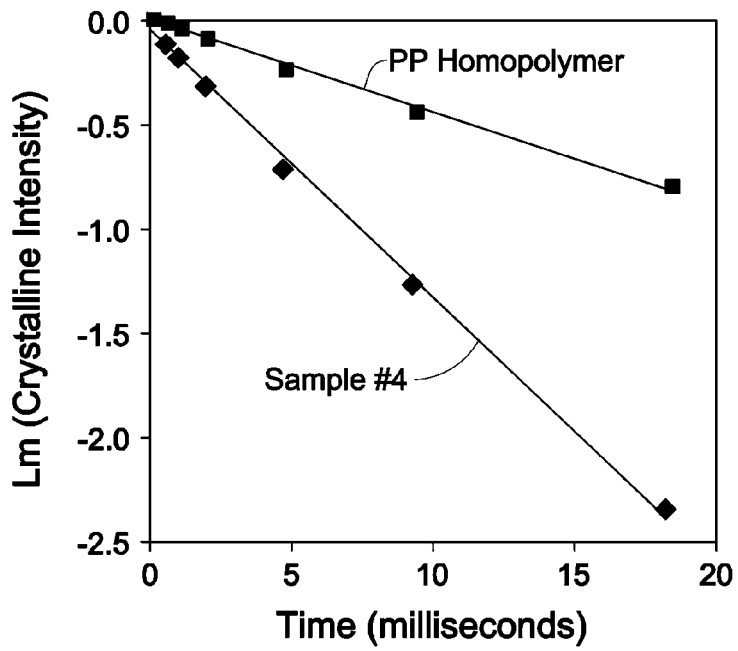
FIG. 1 is a plot of the natural log of crystalline intensity (by $^1$H NMR) versus time in milliseconds; $T_{1\rho}$ referred to in this description is the slope of the line.

We contemplate thermoplastic polymer compositions composed of a majority of propylene with a minor amount of ethylene. These polymer compositions include a linear, single homogeneous macromolecular copolymer structure. These polymers have limited crystallinity due to adjacent isotactic propylene units and have a melting point as described below. They are generally devoid of any substantial intermolecular heterogeneity in tacticity and comonomer composition, and are substantially free of diene. They are also devoid of any substantial heterogeneity in intramolecular composition distribution. In addition, these thermoplastic polymer compositions are unexpectedly soft and elastic.

Copolymer

Monomers in the Copolymer

According to an embodiment of the present invention, the copolymer includes from a lower limit of 5% or 6% or 8% or 10% by weight ethylene-derived units to an upper limit of 20% or 25% by weight ethylene-derived units. These embodiments also will include propylene-derived units present in the copolymer in the range of from a lower limit of 75% or 80% by weight to an upper limit of 95% or 94% or 92% or 90% by weight. These percentages by weight are based on the total weight of the propylene and ethylene-derived units; i.e., based on the sum of weight percent propylene-derived units and weight percent ethylene-derived units being 100%. Within these ranges, these copolymers are mildly crystalline as measured by differential scanning calorimetry (DSC), and are exceptionally soft, while still retaining substantial tensile strength and elasticity. Elasticity, as defined in detail hereinbelow, is a dimensional recovery from elongation for these copolymers. At ethylene compositions lower than the above limits for the copolymer, such polymers are generally crystalline, similar to crystalline isotactic polypropylene, and while having excellent tensile strength, they do not have the favorable softness and elasticity. At ethylene compositions higher than the above limits for the copolymer component, the copolymer is substantially amorphous. While such a material of higher ethylene composition may be soft, these compositions are weak in tensile strength and poor in elasticity. In summary, such copolymers of embodiments of our invention exhibit the softness, tensile strength and elasticity characteristic of vulcanized rubbers, without vulcanization.

In embodiments of the present invention, we intend that the copolymers be substantially free of diene-derived units. Dienes are nonconjugated diolefins which may be incorporated in polymers to facilitate chemical crosslinking reactions. "Substantially free of diene" is defined to be less than 1% diene, or less than 0.5% diene, or less than 0.1% diene, or less than 0.05% diene, or equal to 0%. All of these percentages are by weight in the copolymer. The presence or absence of diene can be conventionally determined by infrared techniques well known to those skilled in the art.

Sources of diene include diene monomer added to the polymerization of ethylene and propylene, or use of diene in catalysts. No matter the source of such dienes, the above outlined limits on their inclusion in the copolymer are contemplated. Conjugated diene-containing metallocene catalysts have been suggested for the formation of copolymers of olefins. However, polymers made from such catalysts will incorporate the diene from the catalyst, consistent with the incorporation of other monomers in the polymerization.

Molecular Weight and Polydispersity Index

Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight, Mz/Mw.

Mz, Mw and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyrogel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975) 287-368; Rodriguez, F., *Principles of Polymer Systems 3rd ed.*, Hemisphere Pub. Corp., NY, (1989) 155-160; U.S. Pat. No. 4,540,753; Verstrate et al., *Macromolecules*, vol. 21, (1988) 3360; and references cited therein.

In embodiments of our invention, a copolymer is included having a weight average molecular weight (Mw) of from 15,000-5,000,000, or from 20,000 to 1,000,000 and a molecular weight distribution Mw/Mn (sometimes referred to as a "polydispersity index" (PDI)) ranging from a lower limit of 1.5 or 1.8 to an upper limit of 40 or 20 or 10 or 5 or 3.

In the measurement of properties ascribed to polymers of embodiments of our invention, there is a substantial absence of a secondary or tertiary polymer or polymers to form a blend. By "substantial absence" we intend less than 10%, or less than 5%, or less than 2.5%, or less than 1%, or 0%, by weight.

In another embodiment, the copolymers of the invention have a weight average molecular weight that can be calculated by application of the following formula:

$$Mw > 6.10 * P * e^{(3370/T)}$$

Wherein:

Mw=the weight average molecular weight

T=the polymerization reaction temperature in degrees Kelvin

Figure 4:
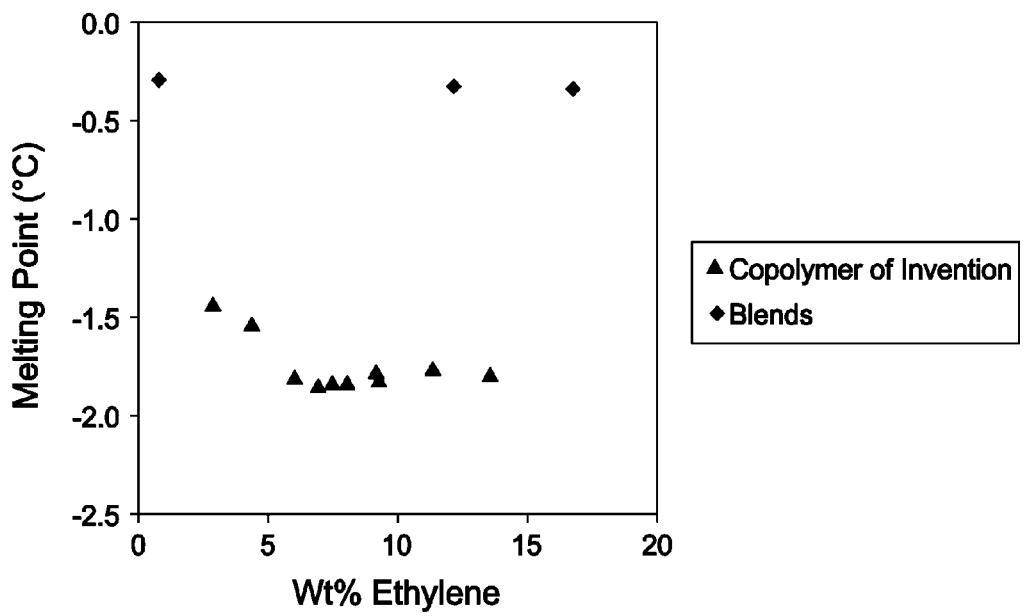
FIG. 4 is a plot of melting point (Tm) in ° C., as determined by DSC, versus percent ethylene of copolymers of the invention (triangle symbols) and blends of isotactic polypropylene with copolymers of the invention (diamond symbols).

P=the steady state propylene concentration in the polymerization reaction zone in moles per liter Melting Point and Crystallinity The copolymer, according to an embodiment of our invention, has a single melting point. The copolymer can be a random copolymer of ethylene and propylene having a melting point (Tm) by Differential Scanning calorimetry (DSC) ranging from an upper limit of less than 110° C., less than 90° C., less than 80° C., or less than 70° C.; to a lower limit of greater than 25° C., or greater than 35° C., or greater than 40° C. or greater than 45° C. FIG. 4 shows the melting point of propylene-ethylene copolymers of the invention as a function of ethylene weight percent, i.e., weight percent of ethylene-derived units (triangle symbols). For comparison, the diamond symbols in FIG. 4 show the melting point of blends of isotactic polypropylene and the inventive copolymers also as a function of weight percent ethylene. FIG. 4 clearly shows that copolymers of the present invention have a lower melting point than propylene-ethylene copolymer/isotactic polypropylene blends having the same weight percent ethylene.

Embodiments of our invention include copolymers having a heat of fusion, as determined by DSC, ranging from a lower limit of greater than 1.0 J/g, or greater than 1.5 J/g, or greater than 4.0 J/g, or greater than 6.0 J/g, or greater than 7.0 J/g, to an upper limit of less than 125 J/g, or less than 100 J/g, or less than 75 J/g, or less than 60 J/g, or less than 50 J/g, or less than 40 J/g, or less than 30 J/g. Without wishing to be bound by theory, we believe that the copolymers of embodiments of our invention have generally isotactic crystallizable propylene sequences, and the above heats of fusion are believed to be due to the melting of these crystalline segments.

In another embodiment, the copolymers of the invention have a heat of fusion that can be calculated by application of the following formula:

$$H_f > 311*(E-18.5)^2/T$$

Wherein:
$H_f$=the heat of fusion, measured as described below
E=the ethylene content (meaning units derived from ethylene) of the copolymer, measured as described below; and
T=the polymerization reaction temperature in degrees Kelvin.

Tacticity Index

The tacticity index, expressed herein as "m/r", is determined by $^{13}$C nuclear magnetic resonance (NMR). The tacticity index m/r is calculated as defined in H. N. Cheng, *Macromolecules*, 17, 1950 (1984). The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 an atactic material. An isotactic material theoretically may have a ratio approaching infinity, and many by-product atactic polymers have sufficient isotactic content to result in ratios of greater than 50. Copolymers of embodiments of our invention can have a tacticity index m/r ranging from a lower limit of 4 or 6 to an upper limit of 8 or 10 or 12.

Triad Tacticity

An ancillary procedure for the description of the tacticity of the propylene units of embodiments of the current invention is the use of triad tacticity. The triad tacticity of a polymer is the relative tacticity of a sequence of three adjacent propylene units, a chain consisting of head to tail bonds, expressed as a binary combination of m and r sequences. It is usually expressed for copolymers of the present invention as the ratio of the number of units of the specified tacticity to all of the propylene triads in the copolymer.

The triad tacticity (mm fraction) of a propylene copolymer can be determined from a $^{13}$C NMR spectrum of the propylene copolymer and the following formula:

$$\text{mm Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

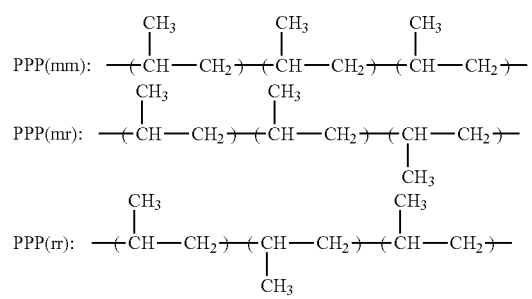

The $^{13}$C NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal *Polymer*, Volume 30 (1989), page 1350.

In the first region, the methyl group of the second unit in the three propylene unit chain represented by PPP (mm) resonates.

In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm).

In the third region, the methyl group of the second unit in the three propylene unit chain represented by PPP (a) resonates, and the methyl group (EPE-methyl group) of a propylene unit whose adjacent units are ethylene units resonates (in the vicinity of 19.8 ppm).

Calculation of the Triad Tacticity and Errors in Propylene Insertion

The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

The propylene copolymers of embodiments of our invention have a triad tacticity of three propylene units, as measured by $^{13}$C NMR, of greater than 75%, or greater than 80%, or greater than 82%, or greater than 85%, or greater than 90%.

Stereo- and Regio-Errors in Insertion of Propylene: 2,1 and 1,3 Insertions

The insertion of propylene can occur to a small extent by either 2,1 (tail to tail) or 1,3 insertions (end to end). Examples of 2,1 insertion are shown in structures 1 and 2 below.

Structure (1):

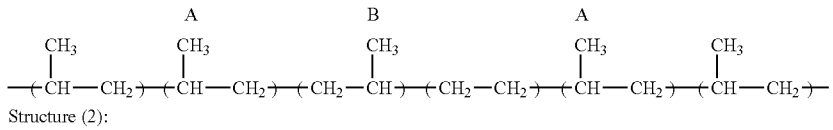

Structure (2):

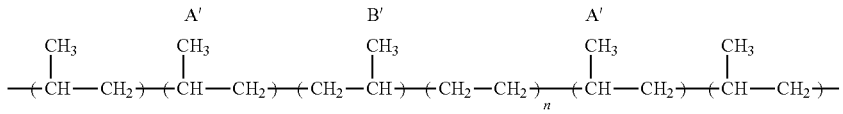

where n≧2.

A peak of the carbon A and a peak of the carbon A' appear in the second region. A peak of the carbon B and a peak of the carbon B' appear in the third region, as described above. Among the peaks which appear in the first to third regions, peaks which are not based on the 3 propylene unit chain consisting of head-to-tail bonds are peaks based on the PPE-methyl group, the EPE-methyl group, the carbon A, the carbon A', the carbon B, and the carbon B'.

The peak area based on the PPE-methyl group can be evaluated by the peak area of the PPE-methine group (resonance in the vicinity of 30.8 ppm), and the peak area based on the EPE-methyl group can be evaluated by the peak area of the EPE-methine group (resonance in the vicinity of 33.1 ppm). The peak area based on the carbon A can be evaluated by twice as much as the peak area of the methine carbon (resonance in the vicinity of 33.9 ppm) to which the methyl group of the carbon B is directly bonded; and the peak area based on the carbon A' can be evaluated by the peak area of the adjacent methine carbon (resonance in the vicinity of 33.6 ppm) of the methyl group of the carbon B'. The peak area based on the carbon B can be evaluated by the peak area of the adjacent methine carbon (resonance in the vicinity of 33.9 ppm); and the peak area based on the carbon B' can be also evaluated by the adjacent methine carbon (resonance in the vicinity of 33.6 ppm).

By subtracting these peak areas from the total peak areas of the second region and the third region, the peak areas based on the three propylene unit chains (PPP(mr) and PPP(rr)) consisting of head-to-tail bonds can be obtained. Thus, the peak areas of PPP(mm), PPP(mr) and PPP(rr) can be evaluated, and the triad tacticity of the propylene unit chain consisting of head-to-tail bonds can be determined.

The proportion of the 2,1-insertions to all of the propylene insertions in a propylene elastomer was calculated by the following formula with reference to article in the journal *Polymer*, vol. 30 (1989), p. 1350.

Proportion of inversely inserted unit based on 2,1-insertion (%) =

$$\frac{0.25 I\alpha\beta(\text{structure}(i)) + 0.5\alpha\beta(\text{structure}(ii))}{I\alpha\alpha + I\alpha\beta(\text{structure}(ii)) + 0.5(I\alpha\gamma + I\alpha\beta(\text{structure}(i)) + I\alpha\delta)} \times 100$$

Naming of the peaks in the above formula was made in accordance with a method by Carman, et al. in the journal *Rubber Chemistry and Technology*, volume 44 (1971), page 781, where $I_{\alpha\delta}$ denotes a peak area of the $\alpha\delta^+$ secondary carbon peak. It is difficult to separate the peak area of $I\alpha\beta$ (structure (i)) from $I\alpha\beta$ (structure (ii)) because of overlapping of the peaks. Carbon peaks having the corresponding areas can be substituted therefor.

The measurement of the 1,3 insertion requires the measurement of the βγ peak. Two structures can contribute to the βγ peak: (1) a 1,3 insertion of a propylene monomer; and (2) from a 2,1-insertion of a propylene monomer followed by two ethylene monomers. This peak is described as the 1,3 insertion peak and we use the procedure described in U.S. Pat. No. 5,504,172, which describes this βγ peak and understand it to represent a sequence of four methylene units. The proportion (%) of the amount of these errors was determined by dividing the area of the βγ peak (resonance in the vicinity of 27.4 ppm) by the sum of all the methyl group peaks and ½ of the area of the βγ peak, and then multiplying the resulting value by 100. If an α-olefin of three or more carbon atoms is polymerized using an olefin polymerization catalyst, a number of inversely inserted monomer units are present in the molecules of the resultant olefin polymer. In polyolefins prepared by polymerization of α-olefins of three or more carbon atoms in the presence of a chiral metallocene catalyst, 2,1-insertion or 1,3-insertion takes place in addition to the usual 1,2-insertion, such that inversely inserted units such as a 2,1-insertion or a 1,3-insertion are formed in the olefin polymer molecule (see, *Macromolecular Chemistry Rapid Communication*, Volume 8, page 305 (1987), by K. Soga, T. Shiono, S. Takemura and W. Kaminski).

The proportion of inversely inserted propylene units of embodiments of our invention, based on the 2,1-insertion of a propylene monomer in all propylene insertions, as measured by $^{13}C$ NMR, is greater than 0.5%, or greater than 0.6%.

The proportion of inversely inserted propylene units of embodiments of our invention, based on the 1,3-insertion of a propylene monomer, as measured by $^{13}C$ NMR, is greater than 0.05%, or greater than 0.06%, or greater than 0.07%, or greater than 0.08%, or greater than 0.085 percent.

Molecular Structure

Homogeneous Distribution

Homogeneous distribution is defined as a statistically insignificant intermolecular difference of both in the composition of the copolymer and in the tacticity of the polymerized propylene. For a copolymer to have a homogeneous distribution it must meet the requirement of two independent tests: (i) intermolecular distribution of tacticity; and (ii) intermolecular distribution of composition, which are described below. These tests are a measure of the statistically insignificant intermolecular differences of tacticity of the polymerized propylene and the composition of the copolymer, respectively.

Intermolecular Distribution of Tacticity

The copolymer of embodiments of our invention has a statistically insignificant intermolecular difference of tacticity of polymerized propylene between different chains (intermolecularly.). This is determined by thermal fractionation by controlled dissolution generally in a single solvent, at a series of slowly elevated temperatures. A typical solvent is a saturated hydrocarbon such as hexane or heptane. These controlled dissolution procedures are commonly used to separate similar polymers of different crystallinity due to differences in isotactic propylene sequences, as shown in the article in *Macromolecules*, Vol. 26, p 2064 (1993). For the copolymers of embodiments of our invention where the tacticity of the propylene units determines the extent of crystallinity, we expected this fractionation procedure will separate the molecules according to tacticity of the incorporated propylene. This procedure is described below.

In embodiments of our invention, at least 75% by weight, or at least 80% by weight, or at least 85% by weight, or at least 90% by weight, or at least 95% by weight, or at least 97% by weight, or at least 99% by weight of the copolymer is soluble in a single temperature fraction, or in two adjacent temperature fractions, with the balance of the copolymer in immediately preceding or succeeding temperature fractions. These percentages are fractions, for instance in hexane, beginning at 23° C. and the subsequent fractions are in approximately 8° C. increments above 23° C. Meeting such a fractionation requirement means that a polymer has statistically insignificant intermolecular differences of tacticity of the polymerized propylene.

Fractionations have been done where boiling pentane, hexane, heptane and even di-ethyl ether are used for the fractionation. In such boiling solvent fractionations, polymers of embodiments of our invention will be totally soluble in each of the solvents, offering no analytical information. For this reason, we have chosen to do the fractionation as referred to above and as detailed herein, to find a point within these traditional fractionations to more fully describe our polymer and the surprising and unexpected insignificant intermolecular differences of tacticity of the polymerized propylene.

Intermolecular Distribution of Composition

The copolymer of embodiments of our invention has statistically insignificant intermolecular differences of composition, which is the ratio of propylene to ethylene between different chains (intermolecular). This compositional analysis is by infrared spectroscopy of the fractions of the polymer obtained by the controlled thermal dissolution procedure described above.

A measure of the statistically insignificant intermolecular differences of composition, each of these fractions has a composition (wt. % ethylene content) with a difference of less than 1.5 wt. % (absolute) or less than 1.0 wt. % (absolute), or less than 0.8 wt. % (absolute) of the average wt. % ethylene content of the whole copolymer. Meeting such a fractionation requirement means that a polymer has statistically insignificant intermolecular differences of composition, which is the ratio of propylene to ethylene.

Uniformity

Uniformity is defined to be a statistically insignificant intramolecular difference of both the composition of the copolymer and in the tacticity of the polymerized propylene. For a copolymer to be uniform it must meet the requirement of two independent tests: (i) intramolecular distribution of tacticity; and (ii) intramolecular distribution of composition, which are described below. These tests are a measure of the statistically insignificant intramolecular differences of tacticity of the polymerized propylene and the composition of the copolymer, respectively.

Intramolecular Distribution of Composition

The copolymer of embodiments of our invention has statistically insignificant intramolecular differences of composition, which is the ratio of propylene to ethylene along the segments of the same chain (intramolecular). This compositional analysis is inferred from the process used for the synthesis of these copolymers as well as the results of the sequence distribution analysis of the copolymer, for molecular weights in the range of from 15,000-5,000,000 or 20,000-1,000,000.

Process

The polymerization process is a single stage, steady state, polymerization conducted in a well-mixed continuous feed polymerization reactor. The polymerization can be conducted in solution, although other polymerization procedures such as gas phase or slurry polymerization, which fulfil the requirements of single stage polymerization and continuous feed reactors, are contemplated.

The process can be described as a continuous, non-batch process that, in its steady state operation, is exemplified by removal of amounts of polymer made per unit time, being substantially equal to the amount of polymer withdrawn from the reaction vessel per unit time. By "substantially equal" we intend that these amounts, polymer made per unit time, and polymer withdrawn per unit time, are in ratios of one to other, of from 0.9:1; or 0.95:1; or 0.97:1; or 1:1. In such a reactor, there will be a substantially homogeneous monomer distribution. At the same time, the polymerization is accomplished in substantially single step or stage or in a single reactor, contrasted to multistage or multiple reactors (two or more). These conditions exist for substantially all of the time the copolymer is produced.

Monomer Sequence Distribution

One method to describe the molecular features of an ethylene-propylene copolymer is monomer sequence distribution. Starting with a polymer having a known average composition, the monomer sequence distribution can be determined using spectroscopic analysis. Carbon 13 nuclear magnetic resonance spectroscopy ($^{13}C$ NMR) can be used for this purpose, and can be used to establish diad and triad distribution via the integration of spectral peaks. (If $^{13}C$ NMR is not used for this analysis, substantially lower $r_1 r_2$ products are normally obtained.) The reactivity ratio product is described more fully in *Textbook of Polymer Chemistry*, F. W. Billmeyer, Jr., Interscience Publishers, New York, p. 221 et seq. (1957).

The reactivity ratio product $r_1 r_2$, where $r_1$ is the reactivity of ethylene and $r_2$ is the reactivity of propylene, can be calculated from the measured diad distribution (PP, EE, EP and PE in this nomenclature) by the application of the following formulae:

$$r_1 r_2 = 4(EE)(PP)/(EP)^2$$

$$r_1 = K_{11}/K_{12} = [2(EE)/EP]X$$

$$r_2 = K_{22}/K_{21} = [2(PP)/(EP)]X$$

$$P = (PP) + (EP/2)$$

$$E = (EE) + (EP/2)$$

where $$\text{Mol \% } E = [(E)/(E+P)]*100$$

X=E/P in reactor;

$K_{11}$ and $K_{12}$ are kinetic insertion constants for ethylene; and $K_{21}$ and $K_{22}$ are kinetic insertion constants for propylene.

As is known to those skilled in the art, a reactivity ratio product $r_1r_2$ of 0 can define an "alternating" copolymer, and a reactivity ratio product of 1 is said to define a "statistically random" copolymer. In other words, a copolymer having a reactivity ratio product $r_1r_2$ of between 0.6 and 1.5 is generally said to be random (in strict theoretical terms, generally only a copolymer having a reactivity ratio product $r_1r_2$ greater than 1.5 contains relatively long homopolymer sequences and is said to be "blocky"). The copolymer of our invention will have a reactivity ratio product $r_1r_2$ of less than 1.5, or less than 1.3, or less than 1.0, or less than 0.8. The substantially uniform distribution of comonomer within polymer chains of embodiments of our invention generally precludes the possibility of significant amounts of propylene units or sequences within the polymer chain for the molecular weights (weight average) disclosed herein.

Intramolecular Distribution of Tacticity

The copolymer of embodiments of our invention has statistically insignificant intramolecular differences of tacticity, which is due to isotactic orientation of the propylene units along the segments of the same chain (intramolecular). This compositional analysis is inferred from the detailed analysis of the differential scanning calorimetry, electron microscopy and relaxation measurement ($T_{1\rho}$). In the presence of significant intramolecular differences in tacticity, we would form 'stereoblock' structures, where the number of isotactic propylene residues adjacent to one another is much greater than statistical. Further, the melting point of these polymers depends on the crystallinity, since the more blocky polymers should have a higher melting point as well as depressed solubility in room temperature solvents.

$T_{1\rho}$: Solid-State $^1H$ NMR $T_{1\rho}$ Relaxation Time

The principle of solid state proton NMR relaxation time ($^1H$ NMR $T_{1\rho}$) and its relationship with polymer morphology have been discussed in *Macromolecules* 32 (1999), 1611. The experimental $T_{1\rho}$ relaxation data of embodiments of the current invention, and polypropylene (PP) homopolymer (control sample) are shown in FIG. 1, which plots the natural log of the crystalline intensity versus time; the experimental procedure for collecting these data is described below. To fit the data with single exponential function, linear regression was performed on the ln(I) vs. t data, where I is the intensity of the crystalline signal. Then, the quality of the fit, $R^2$, is calculated. The $R^2$ for a perfect linear correlation is 1.0. The $R^2$ for polypropylene (control) and a copolymer of the current invention (shown in FIG. 1) are 0.9945 and 0.9967, respectively. Therefore, the $T_{1\rho}$ relaxation for both polypropylene homopolymer and a copolymer of the current invention can be well fitted by a single-exponential. From the fit, the $T_{1\rho}$ of polypropylene and a copolymer of the present invention, are calculated as 25 milliseconds (ms) and 8.7 ms, respectively. The large difference in the $T_{1\rho}$ is reflective of their difference in morphology.

The hypothetical polypropylene-like regions would have $T_{1\rho}$ relaxation similar to that in polypropylene homopolymer. As a result, should such regions exist in embodiments of the invention, the $T_{1\rho}$ relaxation would contain a component that has a $T_{1\rho}$ relaxation time characteristic of polypropylene homopolymer (i.e., $T_{1\rho}$=25 ms). As seen in FIG. 1, the $T_{1\rho}$ relaxation of the current invention can only be well fitted by a single exponential. Incorporation of a component whose $T_{1\rho}$=25 ms would deteriorate the fit. This demonstrates that the polymers of the current invention do not contain long continuous isotactic propylene units. In embodiments of our invention, the $T_{1\rho}$ relaxation time can be less than 18 ms, or less than 16 ms, or less than 14 ms, or less than 12 ms, or less than 10 ms.

$T_{1\rho}$ Measurement.

The experiments are performed on a Bruker DSX-500 Nuclear Magnetic Resonance (NMR) spectrometer, with a $^1H$ frequency of 500.13 MHz and $^{13}C$ frequency of 125.75 MHz. The pulse sequence was a 90° ($^1H$) pulse followed by spin lock and cross polarization ("CP"; time=0.1 ms). A spin lock field strength of $\gamma B_1 = 2\pi*60$ kHz is used. After the spin lock, the magnetization is transferred to $^{13}C$ by CP and then the signal is detected. The crystalline methine signal at 26.7 ppm is recorded and normalized and its natural logarithm (Ln) is plotted against spin lock time in FIG. 1. Measurements were made on a polypropylene homopolymer sample, and on a polymer of the present invention, labeled "Sample 4" and described in the Examples below. Table 1 presents the data.

TABLE 1

| Time (ms) | Ln(I) (sample 4) | Ln(I) (PP) |
|---|---|---|
| 0.02 | 0 | 0 |
| 0.5 | −0.11394 | −0.02496 |
| 1 | −0.18772 | −0.04733 |
| 2 | −0.32424 | −0.09871 |
| 5 | −0.71649 | −0.24692 |
| 10 | −1.27022 | −0.44715 |
| 20 | −2.34181 | −0.79526 |

Catalysts and Activators for Copolymer Production

Catalysts

A typical isotactic polymerization process consists of a polymerization in the presence of a catalyst including a bis (cyclopentadienyl) metal compound and either (1) a non-coordinating compatible anion activator, or (2) an alumoxane activator. According to one embodiment of the invention, this process comprises the steps of contacting ethylene and propylene with a catalyst in a suitable polymerization diluent, the catalyst including, in one embodiment, a chiral metallocene compound, e.g., a bis(cyclopentadienyl) metal compound as described in U.S. Pat. No. 5,198,401, and an activator. U.S. Pat. No. 5,391,629 also describes catalysts useful to produce the copolymers of our invention.

The catalyst system described below useful for making the copolymers of embodiments of our invention, is a metallocene with a non-coordinating anion (NCA) activator, and optionally a scavenging compound. Polymerization is conducted in a solution, slurry or gas phase. The polymerization can be performed in a single reactor process. A slurry or solution polymerization process can utilize sub- or superatmospheric pressures and temperatures in the range of from −25° C. to 110° C. In a slurry polymerization, a suspension of solid, particulate polymer is formed in a liquid polymerization medium to which ethylene, propylene, hydrogen and catalyst are added. In solution polymerization, the liquid medium serves as a solvent for the polymer. The liquid employed as the polymerization medium can be an alkane or a cycloalkane, such as butane, pentane, hexane, or cylclohexane, or an aromatic hydrocarbon, such as toluene, ethylbenzene or xylene. For slurry polymerization, liquid monomer can also be used. The medium employed should be liquid under the conditions of the polymerization and relatively inert. Hexane or toluene can be employed for solution polymerization. Gas phase polymerization processes are described in U.S. Pat. Nos. 4,543,399, 4,588,790, 5,028,670, for example. The catalyst can be supported on any suitable particulate material or porous carrier, such as polymeric supports or inorganic oxides, such as, for example silica, alumina or both. Methods of supporting metallocene catalysts are described in U.S. Pat. Nos. 4,808,561, 4,897,455, 4,937,301, 4,937,217, 4,912,075, 5,008,228, 5,086,025, 5,147,949, and 5,238,892.

Propylene and ethylene are the monomers that can be used to make the copolymers of embodiments of our invention, but optionally, ethylene can be replaced or added to in such polymers with a C4 to C20 α-olefin, such as, for example, 1-butene, 4-methyl-1-pentene, 1-hexene or 1-octene.

Metallocene

The terms "metallocene" and "metallocene catalyst precursor" are terms known in the art to mean compounds possessing a Group 4, 5, or 6 transition metal M, with a cyclopentadienyl (Cp) ligand or ligands which may be substituted, at least one non-cyclopentadienyl-derived ligand X, and zero or one heteroatom-containing ligand Y, the ligands being coordinated to M and corresponding in number to the valence thereof. The metallocene catalyst precursors generally require activation with a suitable co-catalyst (sometimes referred to as an activator) in order to yield an active metallocene catalyst, i.e., an organometallic complex with a vacant coordination site that can coordinate, insert, and polymerize olefins.

Preferred metallocenes are cyclopentadienyl complexes which have two Cp ring systems as ligands. The Cp ligands preferably form a bent sandwich complex with the metal, and are preferably locked into a rigid configuration through a bridging group. These cyclopentadienyl complexes have the general formula:

$$(Cp^1R^1_m)R^3_n(Cp^2R^2_p)MX_q$$

wherein $Cp^1$ and $Cp^2$ are preferably the same; $R^1$ and $R^2$ are each, independently, a halogen or a hydrocarbyl, halocarbyl, hydrocarbyl-substituted organometalloid or halocarbyl-substituted organometalloid group containing up to 20 carbon atoms; m is preferably 1 to 5; p is preferably 1 to 5; preferably two $R^1$ and/or $R^2$ substituents on adjacent carbon atoms of the cyclopentadienyl ring associated therewith can be joined together to form a ring containing from 4 to 20 carbon atoms; $R^3$ is a bridging group; n is the number of atoms in the direct chain between the two ligands and is preferably 1 to 8, most preferably 1 to 3; M is a transition metal having a valence of from 3 to 6, preferably from group 4, 5, or 6 of the periodic table of the elements, and is preferably in its highest oxidation state; each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms; and q is equal to the valence of M minus 2.

Numerous examples of the biscyclopentadienyl metallocenes described above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614.

Illustrative, but not limiting examples of preferred biscyclopentadienyl metallocenes of the type described above are the racemic isomers of:

μ-(CH$_3$)$_2$Si(indenyl)$_2$M(Cl)$_2$,
μ-(CH$_3$)$_2$Si(indenyl)$_2$M(CH$_3$)$_2$,
μ-(CH$_3$)$_2$Si(tetrahydroindenyl)$_2$M(Cl)$_2$,
μ-(CH$_3$)$_2$Si(tetrahydroindenyl)$_2$M(CH$_3$)$_2$,
μ-(CH$_3$)$_2$Si(indenyl)$_2$M(CH$_2$CH$_3$)$_2$, and
μ-(C$_6$H$_5$)$_2$C(indenyl)$_2$M(CH$_3$)$_2$,
wherein M is Zr, Hf, or Ti.

Non-Coordinating Anions

As already mentioned, the metallocene or precursor are activated with a non-coordinating anion. The term "non-coordinating anion" means an anion which either does not coordinate to the transition metal cation or which is only weakly coordinated to the cation, thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those which are compatible, stabilize the metallocene cation in the sense of balancing its ionic charge, yet retain sufficient lability to permit displacement by an ethylenically or acetylenically unsaturated monomer during polymerization. Additionally, the anions useful in this invention may be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to 4 angstroms.

Descriptions of ionic catalysts for coordination polymerization including metallocene cations activated by non-coordinating anions appear in the early work in EP-A-0 277 003, EP-A-0 277 004, U.S. Pat. Nos. 5,198,401 and 5,278,119, and WO 92/00333. These references suggest a method of preparation wherein metallocenes (bis Cp and mono Cp) are protonated by anionic precursors such that an alkyl/hydride group is abstracted from a transition metal to make it both cationic and charge-balanced by the non-coordinating anion. The use of ionizing ionic compounds not containing an active proton but capable of producing both the active metallocene cation and a non-coordinating anion is also known. See, EP-A-0 426 637, EP-A-0 573 403 and U.S. Pat. No. 5,387,568. Reactive cations other than Bronsted acids capable of ionizing the metallocene compounds include ferrocenium, triphenylcarbonium, and triethylsilylium cations. Any metal or metalloid capable of forming a coordination complex which is resistant to degradation by water (or other Bronsted or Lewis acids) may be used or contained in the anion of the second activator compound. Suitable metals include, but are not limited to, aluminum, gold, platinum and the like. Suitable metalloids include, but are not limited to, boron, phosphorus, silicon and the like.

An additional method of making the ionic catalysts uses ionizing anionic pre-cursors which are initially neutral Lewis acids but form the cation and anion upon ionizing reaction with the metallocene compounds. For example tris(pentafluorophenyl) boron acts to abstract an alkyl, hydride or silyl ligand to yield a metallocene cation and stabilizing non-coordinating anion; see EP-A-0 427 697 and EP-A-0 520 732. Ionic catalysts for addition polymerization can also be prepared by oxidation of the metal centers of transition metal compounds by anionic precursors containing metallic oxidizing groups along with the anion groups; see EP-A-0 495 375.

Illustrative, but not limiting, examples of suitable activators capable of ionic cationization of the metallocene compounds of the invention, and consequent stabilization with a resulting non-coordinating anion, include:
 trialkyl-substituted ammonium salts such as:
triethylammonium tetraphenylborate;
tripropylammonium tetraphenylborate;
tri(n-butyl)ammonium tetraphenylborate;
trimethylammonium tetrakis(p-tolyl)borate;
trimethylammonium tetrakis(o-tolyl)borate;
tributylammonium tetrakis(pentafluorophenyl)borate;
tripropylammonium tetrakis(o,p-dimethylphenyl)borate;
tributylammonium tetrakis(m,m-dimethylphenyl)borate;
tributylammonium tetrakis(p-trifluoromethylphenyl)borate;

tributylammonium tetrakis(pentafluorophenyl)borate;
tri(n-butyl)ammonium tetrakis(o-tolyl)borate and the like;
N,N-dialkyl anilinium salts such as:
N,N-dimethylanilinium tetrakis(pentafluorophenyl)borate;
N,N-dimethylanilinium tetrakis(heptafluoronaphthyl)borate;
N,N-dimethylanilinium tetrakis(perfluoro-4-biphenyl)borate;
N,N-dimethylanilinium tetraphenylborate;
N,N-diethylanilinium tetraphenylborate;
N,N-2,4,6-pentamethylanilinium tetraphenylborate and the like;
dialkyl ammonium salts such as:
di-(isopropyl)ammonium tetrakis(pentafluorophenyl)borate;
dicyclohexylammonium tetraphenylborate and the like; and
triaryl phosphonium salts such as:
triphenylphosphonium tetraphenylborate;
tri(methylphenyl)phosphonium tetraphenylborate;
tri(dimethylphenyl)phosphonium tetraphenylborate and the like.

Further examples of suitable anionic precursors include those comprising a stable carbonium ion, and a compatible non-coordinating anion. These include:
tropyllium tetrakis(pentafluorophenyl)borate;
triphenylmethylium tetrakis(pentafluorophenyl)borate;
benzene(diazonium)tetrakis(pentafluorophenyl)borate;
tropyllium phenyltris(pentafluorophenyl)borate;
triphenylmethylium phenyl-(trispentafluorophenyl)borate;
benzene(diazonium) phenyl-tris(pentafluorophenyl)borate;
tropyllium tetrakis(2,3,5,6-tetrafluorophenyl)borate;
triphenylmethylium tetrakis(2,3,5,6-tetrafluorophenyl)borate;
benzene(diazonium)tetrakis(3,4,5-trifluorophenyl)borate;
tropyllium tetrakis(3,4,5-trifluorophenyl)borate;
benzene(diazonium)tetrakis(3,4,5-trifluorophenyl)borate;
tropyllium tetrakis(3,4,5-trifluorophenyl)aluminate;
triphenylmethylium tetrakis(3,4,5-trifluorophenyl)aluminate;
benzene(diazonium)tetrakis(3,4,5-trifluorophenyl)aluminate;
tropyllium tetrakis(1,2,2-trifluoroethenyl)borate;
triphenylmethylium tetrakis(1,2,2-trifluoroethenyl)borate;
benzene(diazonium)tetrakis(1,2,2-trifluoroethenyl)borate;
tropyllium tetrakis(2,3,4,5-tetrafluorophenyl)borate;
triphenylmethylium tetrakis(2,3,4,5-tetrafluorophenyl)borate;
benzene(diazonium)tetrakis(2,3,4,5-tetrafluorophenyl)borate, and the like.

A catalyst system of $\mu$-$(CH_3)_2Si(indenyl)_2Hf(CH_3)_2$ with a cocatalyst of N,N-dimethylanilinium tetrakis(pentafluorophenyl)borate, can be used.

In a preferred embodiment, the activating cocatalyst, precursor ionic compounds comprise anionic Group 13 element complexes having four halogenated aromatic ligands typically bulkier than substituted tetraphenyl boron compounds of the exemplified in the identified prior art. These invention aromatic ligands consist of polycyclic aromatic hydrocarbons and aromatic ring assemblies in which two or more rings (or fused ring systems) are joined directly to one another or together. These ligands, which may be the same or different, are covalently bonded directly to the metal/metalloid center. In a preferred embodiment the aryl groups of said halogenated tetraaryl Group 13 element anionic complex comprise at least one fused polycyclic aromatic hydrocarbon or pendant aromatic ring. Indenyl, napthyl, anthracyl, heptalenyl and biphenyl ligands are exemplary. The number of fused aromatic rings is unimportant so long as the ring junctions and especially the atom chosen as the point of connection to the Group 13 element center permit an essentially tetrahedral structure. Thus, for example, suitable ligands include those illustrated below, the open bond being to the Group 13 atom. See also the polycyclic compound examples in the literature for additional ligand selection, e.g., *Nomenclature of Organic Compounds*, Chs. 4-5 (ACS, 1974).

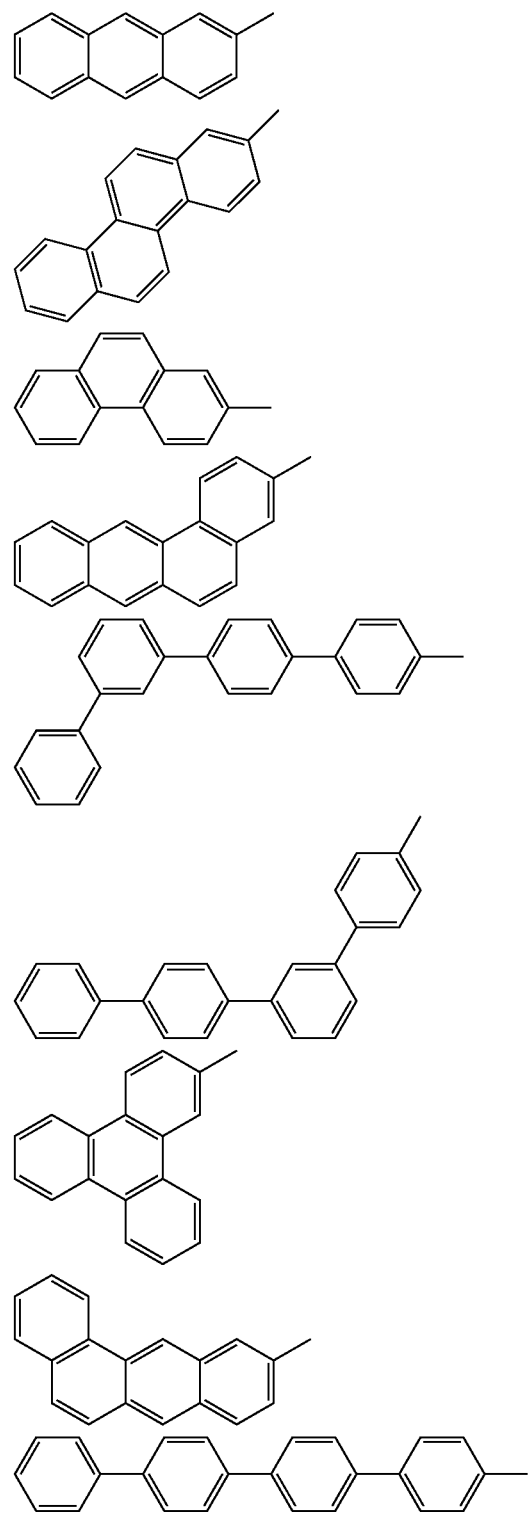

I

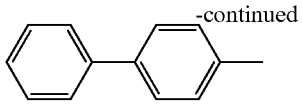

The choice of ligand connection point is particularly important. Substituents or ring junctions ortho to the ligand connection point present such steric bulk that adoption of an essentially tetrahedral geometry is largely precluded. Examples of undesirable connection points are depicted below.

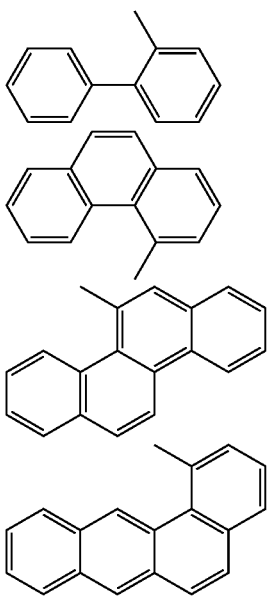

II

Suitable mixed-ligand Group 13 complexes can include fused rings or ring assemblies with ortho-substituents, or ring junctions, so long as those ligands do not exceed two in number. Thus Group 13 anions with one or two hindered fused ring aromatics with three or two unhindered ligands, where hindered aromatics are those having ortho substituents or ring junctions (illustration II) and unhindered are those without (illustration I), will typically be suitable. Tris(perfluorophenyl) (perfluoroanthracyl) borate is an illustrative complex. In this complex the anthracyl ligand is a hindered fused ring having ortho-substituents but its use with three unhindred phenyl ligands allows the complex to adopt a tetrahedral structure. Thus, generically speaking, the Group 13 complexes useful in a accordance with the invention will typically conform to the following formula:

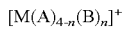

where, M is a Group 13 element, A is an unhindered ligand as described above, B is a hindered ligand as described above, and n=1,2.

For both fused aromatic rings and aromatic ring assemblies, halogenation is highly preferred so as to allow for increased charge dispersion that contributes along with steric bulk as independent features decreasing the likelihood of ligand abstraction by the strongly Lewis acidic metallocene cation formed in the catalyst activation. Additionally, halogenation inhibits reaction of the hafnium cation with any remaining carbon-hydrogen bonds of the aromatic rings, and perhalogenation precludes such potential undesirable reactions. Thus it is preferred that at least one third of hydrogen atoms on carbon atoms of the aryl ligands can be replaced by halogen atoms, and more preferred that the aryl ligands be perhalogenated. Fluorine is the most preferred halogen.

Means of preparing ionic catalyst systems comprising catalytically active cations of the hafnium compounds and suitable noncoordinating anions are conventionally known, see for example U.S. Pat. No. 5,198,401, WO 92/00333, and WO 97/22639. Typically the methods comprise obtaining from commercial sources or synthesizing the selected transition metal compounds comprising an abstractable ligand, e.g., hydride, alkyl or silyl group, and contacting them with a noncoordinating anion source or precursor compound in a suitable solvent. The anion precursor compound abstracts a univalent hydride, alkyl or silyl ligand that completes the valency requirements of the preferred hafnium metallocene compounds. The abstraction leaves the hafnocenes in a cationic state which is counterbalanced by the stable, compatible and bulky, noncoordinating anions according to the invention.

The noncoordinating anions are preferably introduced into the catalyst preparation step as ionic compounds having an essentially cationic complex which abstracts a non-cyclopentadienyl, labile ligand of the transition metal compounds which upon abstraction of the non-cyclopentadienyl ligand, leave as a by-product the noncoordinating anion portion. Hafnium compounds having labile hydride, alkyl, or silyl ligands on the metal center are highly preferred for the ionic catalyst systems of this invention since known in situ alkylation processes may result in competing reactions and interactions that tend to interfere with the overall polymerization efficiency under high temperature conditions in accordance with the preferred process embodiments of the invention.

Suitable cations for precursor compounds capable of providing the noncoordinating anions of the invention cocatalysts include those known in the art. Such include the nitrogen-containing cations such as those in U.S. Pat. No. 5,198,401, the carbenium, oxonium or sulfonium cations of U.S. Pat. No. 5,387,568, metal cations, e.g., Ag$^+$, the silylium cations of WO 96/08519, and the hydrated salts of Group 1 or 2 metal cations of WO 97/22635. Each of the documents of this paragraph are incorporated by reference for purposes of U.S. patent practice.

Examples of preferred precursor salts of the noncoordinating anions capable of ionic cationization of the metallocene compounds of the invention, and consequent stabilization with a resulting noncoordinating anion include trialkyl-substituted ammonium salts such as triethylammonium tetrakis (perfluoronapthyl) or tetrakis(perfluoro-4-biphenyl)boron, tripropylammonium tetrakis(perfluoronapthyl) or tetrakis (perfluoro-4-biphenyl)boron, tri(n-butyl)ammonium tetrakis (perfluoronapthyl) or tetrakis(perfluoro-4-biphenyl)boron, trimethylammonium tetrakis(perfluoronapthyl) or tetrakis (perfluoro-4-biphenyl)boron, trimethylammonium tetra tetrakis(perfluoronapthyl) or tetrakis(perfluoro-4-biphenyl)boron, tributylammonium tetrakis(perfluoronapthyl) or tetrakis (perfluoro-4-biphenyl)boron, tripropylammonium tetrakis (perfluoronapthyl) or tetrakis(perfluoro-4-biphenyl), tributylammonium tetrakis(perfluoronapthyl) or tetrakis(perfluoro-4-biphenyl)boron, tributylammonium tetrakis(perfluoronapthyl) or tetrakis(perfluoro-4-biphenyl)boron, tributylammonium tetrakis(perfluoronapthyl) or tetrakis (perfluoro-4-biphenyl)boron, tri(n-butyl)ammonium tetrakis (perfluoronapthyl) or tetrakis(perfluoro-4-biphenyl)boron and the like; N,N-dialkyl anilinium salts such as N,N-dimethylanilinium tetrakis(perfluoronapthyl) or tetrakis(perfluoro-4-biphenyl)boron, N,N-diethylanilinium tetrakis(perfluoronapthyl) or tetrakis(perfluoro-4-biphenyl)boron, N,N-

2,4,6-pentamethylanilinium tetrakis(perfluoronapthyl) or tetrakis(perfluoro-4-biphenyl)boron and the like; dialkyl ammonium salts such as di-(isopropyl)ammonium tetrakis (perfluoronapthyl) or tetrakis(perfluoro-4-biphenyl)boron, dicyclohexylammonium tetrakis(perfluoronapthyl) or tetrakis(perfluoro-4-biphenyl)boron and the like; and triaryl phosphonium salts such as triphenylphosphonium tetrakis (perfluoronapthyl) or tetrakis(perfluoro-4-biphenyl)boron, tri(methylphenyl)phosphonium tetrakis(per-fluoronapthyl) or tetrakis(perfluoro-4-biphenyl)boron, tri(dimethylphenyl) phosphonium tetrakis(perfluoronapthyl) or tetrakis(perfluoro-4-biphenyl)boron and the like.

Further examples of suitable anionic precursors include those comprising a stable carbenium ion, and a compatible non-coordinating anion. These include tropillium tetrakis (perfluoronapthyl) or tetrakis(perfluoro-4-biphenyl) borate, triphenylmethylium tetrakis(perfluoronapthyl) or tetrakis (perfluoro-4-biphenyl) borate, benzene(diazonium)tetrakis (perfluoronapthyl) or tetrakis(perfluoro-4-biphenyl) borate, tropillium tetrakis(perfluoronapthyl) or tetrakis(perfluoro-4-biphenyl)borate, triphenylmethylium tetrakis(perfluoronapthyl) or tetrakis(perfluoro-4-biphenyl)borate, benzene (diazonium)tetrakis(perfluoronapthyl) or tetrakis(perfluoro-4-biphenyl) borate, tropillium tetrakis(perfluoronapthyl) or tetrakis(perfluoro-4-biphenyl)borate, triphenylmethylium tetrakis(perfluoronapthyl) or tetrakis(perfluoro-4-biphenyl) borate, benzene(diazonium)tetrakis(perfluoronapthyl) or tetrakis(perfluoro-4-biphenyl)borate. The essentially structurally equivalent silylium borate or aluminate salts are similarly suitable.

In yet another embodiment, the NCA portion comprises an acetylene group and is sometimes referred to as an "acetylaryl" moiety. A distinguishing feature of invention NCAs is the presence of an acetylenic functional group bound to a Group-13 atom. The Group-13 atom also connects to at least one fluorinated ring moiety: monofluorinated up through perfluorinated. In addition to a first ring moiety, the Group-13 atom has two other ligands that may also be ring moieties similar to or different from the first ring moiety and may be monofluorinated to perfluorinated. The goal of fluorination is to reduce the number of abstractable hydrogen. A ligand is referred to as substantially fluorinated when enough hydrogen has been fluorine-replaced so that the amount of remaining abstractable hydrogen is small enough that it does not interfere with commercial polymerization.

An exemplary invention NCA is shown below.

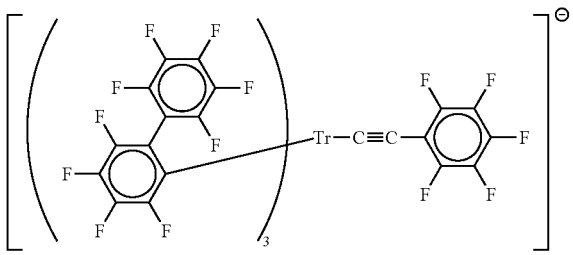

Tr stands for triel, which, for this disclosure, encompasses B and Al. When Tr=B, this NCA is called tris(2',3,3',4,4',5, 5',6,6'-nonafluorobiphen-2-yl)(2-perfluorophenylethyn-2-yl)borate.

The cationic portion of activators according to this embodiment preferably has the form $R_3PnH$, wherein R represents an alkyl or aryl moiety; Pn represents a pnictide; N, P, or As; and H is hydrogen. Suitable R are shown below. This list does not limit the scope of the invention; any R that allows the cationic portion to function as described is within the scope of this invention. R includes, but is not limited to, methyl, phenyl, ethyl, propyl, butyl, hexyl, octyl, nonyl, 3-ethylnonyl, isopropyl, n-butyl, cyclohexyl, benzyl, trimethylsilyl, triethylsilyl, tri-n-propylsilyl, tri-isopropylsilyl, methylethylhexylsilyl, diethylnonlysilyl, triethylsilylpropyl, 2,2-dimethyloctyl, triethylsilylethyl, tri-n-propylsilylhexyl, tri-isopropylsilyloctyl, and methyldiethylsilyloctyl.

Properties and Analysis of the Copolymer
Elongation and Tensile Strength

Elongation and tensile strength were measured as described below. The copolymers of the current invention have an elongation of greater than 1000%, or greater than 1200%, or greater than 1500%.

The copolymers of the current invention have a tensile strength greater than 300 psi (2.1 MPa), or greater than 500 psi (3.5 MPa) or greater than 1000 psi (6.9 MPa).

Tensile and elongation properties are determined at 20 in/min (51 cm/min) according to the procedure described in ASTM D790. The data is reported in engineering units with no correction to the stress for the lateral contraction in the specimen due to tensile elongation. The tensile and elongation properties of embodiments of our invention are evaluated using dumbbell-shaped samples. The samples are compression molded at 180° C. to 200° C. for 15 minutes at a force of 15 tons (133 kN) into a plaque of dimensions of 6 in×6 in (15 cm×15 cm). The cooled plaques are removed and the specimens are removed with a die. The elasticity evaluation of the samples is conducted on an Instron 4465, made by Instron Corporation of 100 Royall Street, Canton, Mass. The digital data is collected in a file collected by the Series IX Material Testing System available from Instron Corporation and analyzed using Excel 5, a spreadsheet program available from Microsoft Corporation of Redmond, Wash.

Elasticity

Embodiments of our invention are elastic after tensile deformation. The elasticity, represented by the fractional increase in the length of the sample, represented as percent of the length of the sample, is measured according to the general procedure ASTM D790. During tensile elongation, the copolymer sample is stretched, and the polymer attempts to recover its original dimensions when the stretching force is removed. This recovery is not complete, and the final length of the relaxed sample is slightly longer than that of the original sample. Elasticity is represented by the fractional increase in the length of the sample, expressed as a percent of the length of the original un-stretched sample.

The protocol for measuring the elasticity of the sample consists of prestretching the deformable zone of the dumbbell, made according to the procedure described above for the measurement of elongation and tensile strength, which is the narrow portion of the specimen, to 200% of its original length to prestretch the sample. This is conducted at a deformation rate of 10 inches (25 cm) per minute. The sample is relaxed at the same rate to form an analytical specimen which is a prestretched specimen of the original sample. This slightly oriented, or prestretched, sample is allowed to relax for 48 hours, at room temperature, prior to the determination of elasticity. The length of the deformation zone in the sample is measured to be $d_1$. After the 48 hours, it is again deformed at 10 inches per minute for a 200% extension of the deformation zone of the sample and allowed to relax at the same rate. The sample is removed and after 10 minutes of relaxation the sample is measured to have a new length of the deformation zone of $d_2$. The elasticity of the sample as a percent is determined as $100*(d_2-d_1)/d_1$.

Embodiments of the invention have elasticity, as measured by the procedure described above, of less than 30%, or less than 20%, or less than 10%, or less than 8% or less than 5%.

These values of the elasticity over the range of composition of the copolymer vary with the tensile strength of the sample as measured by the 500% tensile modulus. Elasticity of this family of copolymers is thus represented by two criteria: (a) extensibility to 500% elongation with a measurable modulus (500% tensile modulus) and (b) elasticity from an extension to 200% elongation on a slightly oriented sample as described above. First, the copolymer of embodiments of our invention should have a measurable tensile strength at 500% elongation (also known as 500% tensile modulus), of greater than 0.5 MPa, or greater than 0.75 MPa, or greater than 1.0 MPa, or greater than 2.0 MPa; and second, the copolymer should have the above-described elasticity.

Figure 3:
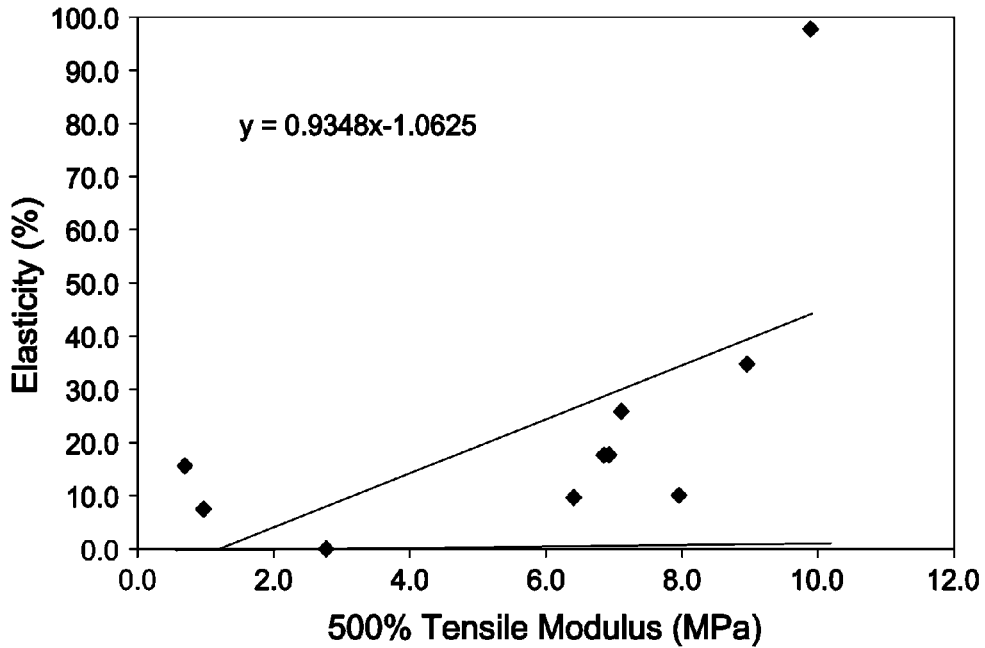
FIG. 3 is a plot of elasticity, in percent, versus 500% tensile modulus, in MPa.

Alternatively, the relationship of elasticity to 500% tensile modulus may be described. Referring to FIG. 3, elasticity is plotted versus 500% tensile modulus in MPa for copolymers of the invention. The plotted data correspond to Samples 5-14 in Table 6 of the Examples herein. A linear regression fit of the data yields a relationship of:

$$\text{Elasticity}(\%) = 0.9348M - 1.0625$$

where M is the 500% tensile modulus in MPa. In embodiments of the present invention, the elasticity as a function of 500% tensile modulus in MPa is defined by:

$$\text{Elasticity}(\%) \leq 0.935M + 12; \text{ or}$$

$$\text{Elasticity}(\%) \leq 0.935M + 6; \text{ or}$$

$$\text{Elasticity}(\%) \leq 0.935M.$$

Flexural Modulus

Softness of the copolymers of embodiments of the invention may be measured by flexural modulus. Flexural modulus is measured in accordance with ASTM D790, using a Type IV dogbone at crosshead speed of 0.05 in/min (1.3 mm/min). The values of the flexural modulus over the range of composition of the copolymer vary with the tensile strength of the sample as measured by the 500% tensile modulus. Flexural modulus of this family of copolymers is thus represented by two criteria: (a) extensibility to 500% elongation with a measurable modulus (500% tensile modulus); and (b) flexural modulus.

Figure 2:
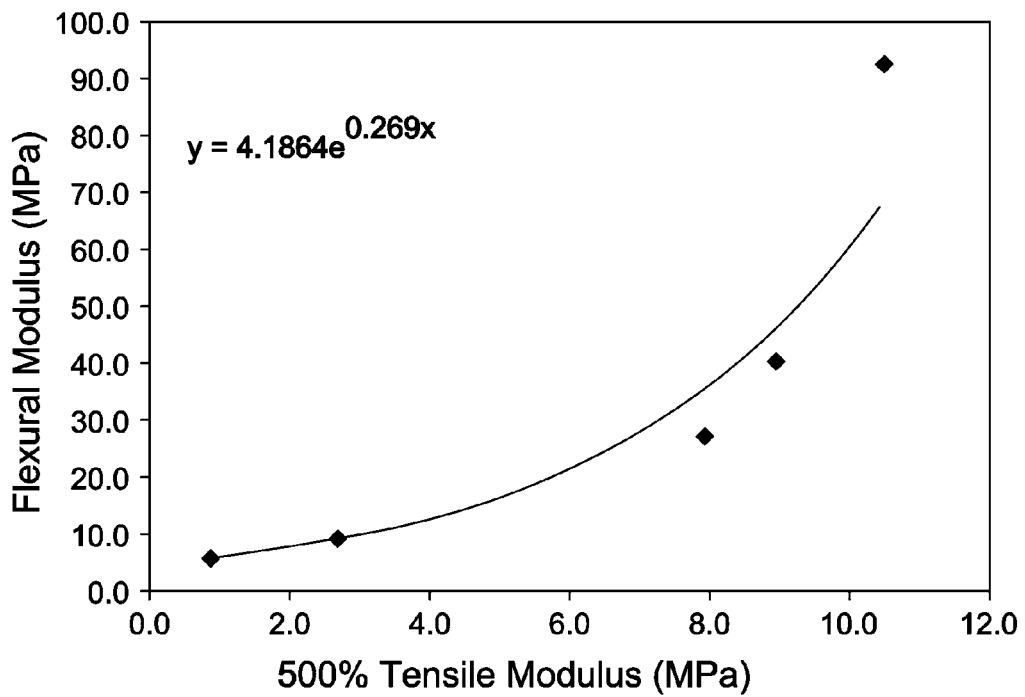
FIG. 2 is a plot of flexural modulus, in MPa, versus 500% tensile modulus, in MPa.

Referring to FIG. 2, flexural modulus in MPa is plotted versus 500% tensile modulus in MPa for copolymers of the invention. The plotted data correspond to Samples 15-19 in Table 7 of the Examples herein. A single exponential fit of the data yields a relationship of:

$$\text{Flexural Modulus(MPa)} = 4.1864 e^{0.269M}$$

where M is the 500% tensile modulus in MPa. In embodiments of the present invention, the flexural modulus in MPa as a function of 500% tensile modulus in MPa is defined by:

$$\text{Flexural Modulus} \leq 4.2 e^{0.27M} + 50; \text{ or}$$

$$\text{Flexural Modulus} \leq 4.2 e^{0.27M} + 30; \text{ or}$$

$$\text{Flexural Modulus} \leq 4.2 e^{0.27M} + 10; \text{ or}$$

$$\text{Flexural Modulus} \leq 4.2 e^{0.27M} + 2.$$

Ethylene Composition

The composition of ethylene propylene copolymers is measured as ethylene wt. % according to ASTM D3900 as follows. A thin homogeneous film of the copolymer component, pressed at a temperature of at or greater than 150° C., is mounted on a Perkin Elmer PE 1760 infra red spectrophotometer. A full spectrum of the sample from 600 cm$^{-1}$ to 4000 cm$^{-1}$ is recorded, and the ethylene weight percent of the copolymer component is calculated from:

$$\text{Ethylene wt. \%} = 82.585 - 111.987X + 30.045X^2$$

where X is the ratio of the peak height at 1155 cm$^{-1}$ to peak height at either 722 cm$^{-1}$ or 732 cm$^{-1}$, which ever is higher.

Molecular Weight and PDI

Techniques for determining the molecular weight (Mn and Mw) and molecular weight distribution (MWD) are found in U.S. Pat. No. 4,540,753, and in *Macromolecules,* 1988, volume 21, p. 3360 (Verstrate et al).

Melting Point and Heat of Fusion

Melting point and heat of fusion are measured by Differential Scanning calorimetry (DSC) follows. About 6 to 10 mg of a sheet of the polymer pressed at approximately 200° C. to 230° C. is removed with a punch die. This is annealed at room temperature for 24 hours. At the end of this period, the sample is placed in a Differential Scanning calorimeter (Perkin Elmer 7 Series Thermal Analysis System) and cooled to about −50° C. to about −70° C. The sample is heated at 20° C./min to attain a final temperature of about 200° C. to about 220° C. The thermal output is recorded as the area under the melting peak of the sample, which is typically peaked at about 30° C. to about 175° C. and occurs between the temperatures of about 0° C. and about 200° C., and is measured in joules as a measure of the heat of fusion. The melting point is recorded as the temperature of the greatest heat absorption within the range of melting of the sample.

Intermolecular Composition and Tacticity Distribution Determination

Intermolecular composition distribution of the copolymer is measured as described below. Nominally 30 grams of the copolymer is cut into small cubes with about ⅛" (3 mm) sides. This is introduced into a thick-walled glass bottle with a screw cap closure, along with 50 mg of Irganox1076, an antioxidant commercially available from Ciba-Geigy Corporation. Then, 425 mL of hexane (a principal mixture of normal and iso isomers) is added to the bottle and the sealed bottle is maintained at 23° C. for 24 hours. At the end of this period, the solution is decanted and the residue is treated with additional hexane for an additional 24 hours. At the end of this period, the two hexane solutions are combined and evaporated to yield a residue of the polymer soluble at 23° C. To the residue is added sufficient hexane to bring the volume to 425 mL and the bottle is maintained at 31° C. for 24 hours in a covered circulating water bath. The soluble polymer is decanted and an additional amount of hexane is added for another 24 hours at 31° C. prior to decanting. In this manner, fractions of the copolymers soluble at 40° C., 48° C., 55° C. and 62° C. are obtained at temperature increases of approximately 8° C. between stages. Increases in temperature to 95° C. can be accommodated if heptane, instead of hexane, is used as the solvent for all temperatures above about 60° C. The soluble polymers are dried, weighed and analyzed for composition, as wt. % ethylene content, by the IR technique described above. Soluble fractions obtained in the adjacent temperature fractions are the adjacent fractions in the specification above.

EXAMPLES

Example 1

Ethylene/Propylene Copolymerization

Continuous polymerization of the polymer is conducted in a 9 liter Continuous Flow Stirred Tank Reactor using hexane as the solvent. The liquid full reactor has a residence time of 9 minutes and the pressure is maintained at 700 kPa. A mixed feed of hexane, ethylene and propylene is pre-chilled to approximately −30° C. to remove the heat of polymerization, before entering the reactor. Solutions of catalyst/activator in toluene and the scavenger in hexane are separately and continuously admitted into the reactor to initiate the polymerization. The reactor temperature is maintained between 35 and 50° C., depending on the target molecular weight. The feed temperature is varied, depending on the polymerization rate to maintain a constant reactor temperature. The polymerization rate is varied from about 0.5 kg/hr to about 4 kg/hr. Hexane at 30 kg/hr is mixed with ethylene at 717 g/hr and propylene at 5.14 kg/hr and fed to the reactor. The polymerization catalyst, dimethylsilyl bridged bis-indenyl hafnium dimethyl activated 1.1 molar ratio with N',N'-dimethyl anilinium-tetrakis (pentafluorophenyl)borate is introduced at the rate of at 0.0135 g/hr. A dilute solution of triisobutyl aluminum is introduced into the reactor as a scavenger of catalyst terminators; a rate of approximately 111 mol of scavenger per mole of catalyst is adequate for this polymerization After the polymerization reaches steady state, a representative sample of the polymer produced in this polymerization is collected, and then steam-distilled to isolate the polymer. The polymerization rate is measured as 3.7 kg/hr. The polymer produced in this polymerization has an ethylene content of 14%, ML (1+4) 125° C. (Mooney Viscosity) of 13.1 and has isotactic propylene sequences.

Variations in the composition of the polymer are obtained principally by changing the ratio of ethylene to propylene. Molecular weight of the polymer is varied by either changing the reactor temperature or by changing the ratio of total monomer feed rate to the polymerization rate.

In the manner described in Example 1 above, polymers of the above specification are synthesized. These are described in the tables below. Table 2 describes the results of the GPC, composition, and DSC analysis for the polymers.

TABLE 2

Analysis of the polymers

| Sample # | $^{13}$C NMR RESULTS | | | | | DSC Results | |
|---|---|---|---|---|---|---|---|
| | Ethylene (wt %) | Triad (mm) | 2,1 insertion (%) | 1,3 insertion (%) | m/r | Heat of fusion (J/g) | Melting Point (° C.) |
| #1 | 11.0 | 90.1 | 0.63 | 0.098 | 7.1 | 19 | 49 |
| #2 | 18.5 | 91.3 | 0.84 | 0.12 | 6.2 | 1.8 | 50 |
| #3 | 9.4 | 91.8 | 0.80 | 0.086 | 6.9 | 27 | 69 |
| #4 | 14.1 | 90.6 | 0.74 | 0.13 | 7.7 | 8.0 | 51 |

TABLE 3

Fractional solubility of copolymer (hexane)

| | Wt % soluble at T | | |
|---|---|---|---|
| Sample # | 23° C. | 31° C. | 40° C. |
| 1 | 39.2 | 60.0 | 0.5 |
| 2 | 97.6 | 2.1 | |
| 3 | 0.7 | 52.3 | 48.1 |
| 4 | 99.3 | 0.7 | |

Table 4 describes the composition of the fractions of the copolymer obtained in Table 3. Only fractions which have more than 4% of the total mass of the polymer have been analyzed for composition.

TABLE 4

Composition of fractions of the copolymer component obtained in Table 3

| | Composition (wt % C2) for fraction soluble at T | | |
|---|---|---|---|
| Sample # | 23° C. | 31° C. | 40° C. |
| 1 | 10.8 | 11.3 | — |
| 2 | 17.9 | — | |
| 3 | — | 9.9 | 10.2 |
| 4 | 14.5 | — | |

The experimental inaccuracy in the determination of the ethylene content is believed to be approximately 0.4 wt % absolute.

TABLE 5

Mechanical properties of the polymers

| | Mechanical Properties | | |
|---|---|---|---|
| Sample # | Tensile Strength (psi, MPa) | 500% Tensile Modulus (psi, MPa) | Elasticity (%) |
| 1 | 3226.5, 22.25 | 1412, 9.74 | 17 |
| 2 | 334.0, 2.30 | 129, 0.889 | 1.5 |
| 3 | 5041.3, 34.76 | 2300, 15.86 | 24 |
| 4 | 1277.7, 8.810 | 387, 2.67 | 0 |

TABLE 6

Mechanical properties of the polymers

| | Composition | Mechanical Properties | |
|---|---|---|---|
| Sample # | Ethylene Content (wt %) | 500% Tensile Modulus (MPa) | Elasticity (%) |
| 5 | 12.4 | 6.8 | 3.1 |
| 6 | 12.0 | 7.9 | 1.6 |
| 7 | 17.0 | 0.9 | 1.6 |
| 8 | 11.1 | 9.9 | 18.8 |
| 9 | 10.8 | 8.9 | 6.4 |
| 10 | 12.1 | 6.9 | 3.1 |
| 11 | 13.4 | 6.4 | 1.6 |

TABLE 6-continued

Mechanical properties of the polymers

| | Composition | Mechanical Properties | |
|---|---|---|---|
| Sample # | Ethylene Content (wt %) | 500% Tensile Modulus (MPa) | Elasticity (%) |
| 12 | 14.8 | 2.7 | 0 |
| 13 | 16.4 | 0.6 | 3.1 |
| 14 | 13.4 | 7.1 | 4.7 |

TABLE 7

Mechanical properties of the polymers

| | Composition | Mechanical Properties | |
|---|---|---|---|
| Sample # | Ethylene Content (wt %) | 500% Tensile Modulus (MPa) | Flexural Modulus (MPa) |
| 15 | 12.0 | 7.9 | 26.8 |
| 16 | 14.8 | 2.7 | 9.2 |
| 17 | 17.0 | 0.9 | 5.6 |
| 18 | 10.8 | 8.9 | 40.1 |
| 19 | 10.0 | 10.3 | 93.0 |

Example 2

Ethylene/Propylene Copolymerization

Continuous Polymerization of the polymer was conducted in a 1 liter internal volume Continuous Flow Stirred Tank Reactor using hexane as the solvent. The liquid full reactor had a variable residence time of approximately 9 to 15 minutes (as described in the table below) and the pressure was maintained at 700 kpa. A mixed feed of Hexane, ethylene and propylene was pre-chilled to approximately −30° C. to remove the heat of polymerization, before entering the reactor. The pre-chilling temperature was adjusted to maintain indicated solution polymerization temperature. The solution of catalyst/activator in Toluene and the scavenger in hexane were separately and continuously admitted into the reactor to initiate the polymerization. The reactor temperature was maintained between 50 and 95° C. and the polymerization rate could be varied from 0.1 kg/hr to 0.5 kg/hr as shown in Tables 8 through 13, below.

Hexane, ethylene, and propylene were fed to the reactor at the rates shown in Tables 8 through 12. The polymerization catalyst, dimethyl silyl bridged bis-indenyl Hafnium dimethyl was activated in vitro with 1:1 molar ratio with NCA indicated below in the tables and introduced into the polymerization reactor at the rate of 0.0135 g/hr. Two NCA's were used: N',N'-Dimethyl anilinium-tetrakis (pentafluorophenyl) borate (A1) and N,N'-Dimethyl anilinium-tetrakis (heptafluoro-1-napthyl)borate (A2). A dilute solution of triisobutyl aluminum was introduced into the reactor as a scavenger of catalyst terminators. A rate of approximately 1.11 mole of scavenger per mole of catalyst was adequate for this polymerization. After five residence times of steady polymerization, a representative sample of the polymer produced in this polymerization was collected. The solution of the polymer was withdrawn from the top, and then steam distilled to isolate the polymer. The polymerization rate was measured as shown in the tables below. The polymer produced in this polymerization was analyzed for ethylene content by FT-IR, molecular weight averages by GPC. Crystallinity was measured by DSC and the amount of mm triads of propylene residues in the polymer chain was determined by $^{13}C$ NMR. As we have mentioned above the crystallinity and mm triads determination are redundant determinations since the crystallinity of the polymers are dependent only on the isotactic propylene residues.

The data in the tables below shows the effect of the changes in the polymerization conditions (temperature, NCA and residual monomer concentration) on propylene/ethylene copolymers made at two distinct compositions. The first composition contains approximately 7 wt % ethylene and the second contains approximately 14 wt % ethylene. The data will show that the benefits of the invention are available across the composition range for these propylene-ethylene polymers.

This example illustrates the difference in the polymerization of A1 and A2 with the polymerization being conducted at a range of increasing temperatures between 50° C. and 95° C. For each polymerization condition temperature the same polymerization monomer, solvent and catalyst feed are used to make polymers of essentially identical composition. For any activator the rise in the polymerization temperature lowers the crystallinity and molecular weight of the polymer, however the replacement of A1 by A2 raises both the crystallinity as well as the molecular-weight.

TABLE 8

Polymerization Conditions and Polymer Products

| | | Polymerization Reactor | | | | | | Polymer | | |
|---|---|---|---|---|---|---|---|---|---|---|
| | | | Hexane | | | Polymer | Steady | | Polymer | |
| Sample # | NCA | Temp (° C.) | Solvent (kg/hr) | Ethylene (g/hr) | Propylene (g/hr) | Product (kg/hr) | State $C_3^=$ (moles/l) | $C_2^=$ wt %* | mm % $^{13}C$ NMR | Mw (x1000) | Tm (° C.) |
| 20-C | A1 | 50 | 3.56 | 24 | 438 | 0.30 | 0.58 | 6.5 | 92 | 148 | 91 |
| 21-C | A1 | 65 | 3.56 | 24 | 438 | 0.29 | 0.62 | 6.8 | 85 | 67 | 85 |
| 22-C | A1 | 80 | 3.56 | 24 | 438 | 0.29 | 0.63 | 7.1 | 83 | 44 | 71 |
| 23-C | A1 | 95 | 3.56 | 24 | 438 | 0.28 | 0.69 | 8.4 | 77 | 22 | 62 |
| 24 | A2 | 50 | 3.56 | 24 | 438 | 0.30 | 0.59 | 7.2 | 93 | 290 | 110 |
| 25 | A2 | 65 | 3.56 | 24 | 438 | 0.29 | 0.65 | 7.5 | 91 | 215 | 101 |
| 26 | A2 | 80 | 3.56 | 24 | 438 | 0.28 | 0.69 | 7.7 | 90 | 150 | 96 |
| 27 | A2 | 95 | 3.56 | 24 | 438 | 0.28 | 0.68 | 8.5 | 89 | 80 | 83 |

*Understood to mean units derived from ethylene

Samples 20-C Through 23-C (Comparative) and 24 Through 27:

This example illustrates the difference in the polymerization of A1 and A2 with the polymerization being conducted at a temperature of 95° C. During each series of polymerization the composition of the polymer is held essentially constant but the residual level of monomer is progressively raised. For both A1 and A2 activated polymerization the rise in the residual monomer concentration raises the crystallinity of the propylene residues in the polymer.

TABLE 9

Polymerization Conditions and Polymer Products

| | | Polymerization Reactor | | | | | | Polymer | | |
|---|---|---|---|---|---|---|---|---|---|---|
| | | | Hexane | | | Polymer | Steady | | Polymer | |
| Sample # | NCA | Temp (° C.) | Solvent (kg/hr) | Ethylene (g/hr) | Propylene (g/hr) | Product (kg/hr) | State $C_3^=$ (mole/l) | $C_2^=$ wt % | mm % $^{13}$C NMR | Mw (x1000) | Tm (° C.) |
| 28C | A1 | 95 | 3.56 | 24 | 438 | 0.28 | 0.69 | 8.4 | 77 | 22 | 62 |
| 29C | A1 | 95 | 3.17 | 24 | 438 | 0.27 | 0.81 | 8.7 | 79 | 25 | 64 |
| 30C | A1 | 95 | 3.17 | 27.6 | 504 | 0.32 | 0.83 | 6.9 | 81 | 26 | 66 |
| 31C | A1 | 95 | 3.17 | 31.7 | 579 | 0.40 | 0.84 | 7.4 | 81 | 28 | 67 |
| 32 | A2 | 95 | 3.56 | 24 | 438 | 0.29 | 0.65 | 7.8 | 89 | 87 | 64 |
| 33 | A2 | 95 | 3.56 | 27 | 504 | 0.36 | 0.63 | 7.8 | 91 | 88 | 72 |
| 34 | A2 | 95 | 3.17 | 27 | 504 | 0.35 | 0.73 | 7.8 | 91 | 101 | 87 |
| 35 | A2 | 95 | 3.17 | 31.2 | 582 | 0.40 | 0.84 | 7.8 | 94 | 102 | 95 |
| 36 | A2 | 95 | 2.77 | 31.2 | 582 | 0.42 | 0.85 | 7.8 | 95 | 120 | 102 |

Samples 28-C Through 31-C (Comparative) and 32 Through 36:

This example illustrates the difference in the polymerization of A1 and A2 with the polymerization being conducted at a temperature of 95° C. During each series of polymerization the composition of the polymer is held essentially constant but the residual level of monomer is progressively raised. For both A1 and A2 activated polymerization the rise in the residual monomer concentration raises the crystallinity of the propylene residues in the polymer. The examples differ from the data in examples immediately earlier in that a propylene-ethylene copolymer having a higher ethylene content was made. These data in conjunction indicate that the effect of the replacement of A1 by A2 is not limited by the ethylene content of the polymer.

TABLE 10

Polymerization Conditions and Polymer Products

| | | Polymerization reactor | | | | | | Polymer | | |
|---|---|---|---|---|---|---|---|---|---|---|
| | | | Hexane | | | Polymer | Steady | | Polymer | |
| Sample # | NCA | Temp (° C.) | Solvent (kg/hr) | Ethylene (g/hr) | Propylene (g/hr) | Product (kg/hr) | State $C_3^=$ (mole/l) | $C_2^=$ wt % | Mw (x1000) | Tm (° C.) | $H_f$ (j/g) |
| 37C | A1 | 95 | 3.56 | 45 | 438 | 0.36 | 0.52 | 16.9 | 28 | no | na |
| 38C | A1 | 95 | 3.56 | 52.2 | 504 | 0.37 | 0.70 | 14.8 | 34 | no | na |
| 39C | A1 | 95 | 3.17 | 52.2 | 504 | 0.37 | 0.79 | 17.8 | 34 | no | na |
| 40C | A1 | 95 | 3.17 | 60 | 582 | 0.35 | 1.13 | 16.9 | 45 | 47 | 0.14 |
| 41C | A1 | 95 | 2.77 | 60 | 582 | 0.41 | 1.01 | 15.3 | 47 | 48 | 0.78 |
| 42 | A2 | 95 | 3.56 | 45 | 438 | 0.36 | 0.52 | 17.2 | 108 | 45 | 0.22 |
| 43 | A2 | 95 | 3.56 | 52.2 | 504 | 0.37 | 0.70 | 14.9 | 107 | 46 | 6.4 |
| 44 | A2 | 95 | 3.17 | 52.2 | 504 | 0.37 | 0.75 | 15.1 | 110 | 45 | 6.8 |
| 45 | A2 | 95 | 3.17 | 60 | 582 | 0.35 | 1.14 | 17.6 | 113 | 47 | 5.7 |
| 46 | A2 | 95 | 2.77 | 60 | 582 | 0.41 | 1.04 | 17.0 | 123 | 48 | 6.8 |

Samples 37-C Through 41-C (Comparative) and 42 Through 46:

This example illustrates the difference in the polymerization of A1 and A2 with the polymerization being conducted at a range of increasing temperatures between 50° C. and 95° C. For each polymerization condition temperature the same polymerization monomer, solvent and catalyst feed are used to make polymers of essentially identical composition. For any activator the rise in the polymerization temperature lowers the crystallinity and molecular weight of the polymer, however the replacement of A1 by A2 raises both the crystallinity as well as the molecular weight. The examples differ from the data in examples 1-8 earlier in that a propylene-ethylene copolymer having a higher ethylene content was made. These data in conjunction indicate that the effect of the replacement of A1 by A2 is not limited by the ethylene content of the polymer.

viously above. Comparative examples 69-C to 76-C have data for polymers of the similar composition made with A1.

Figure 5:
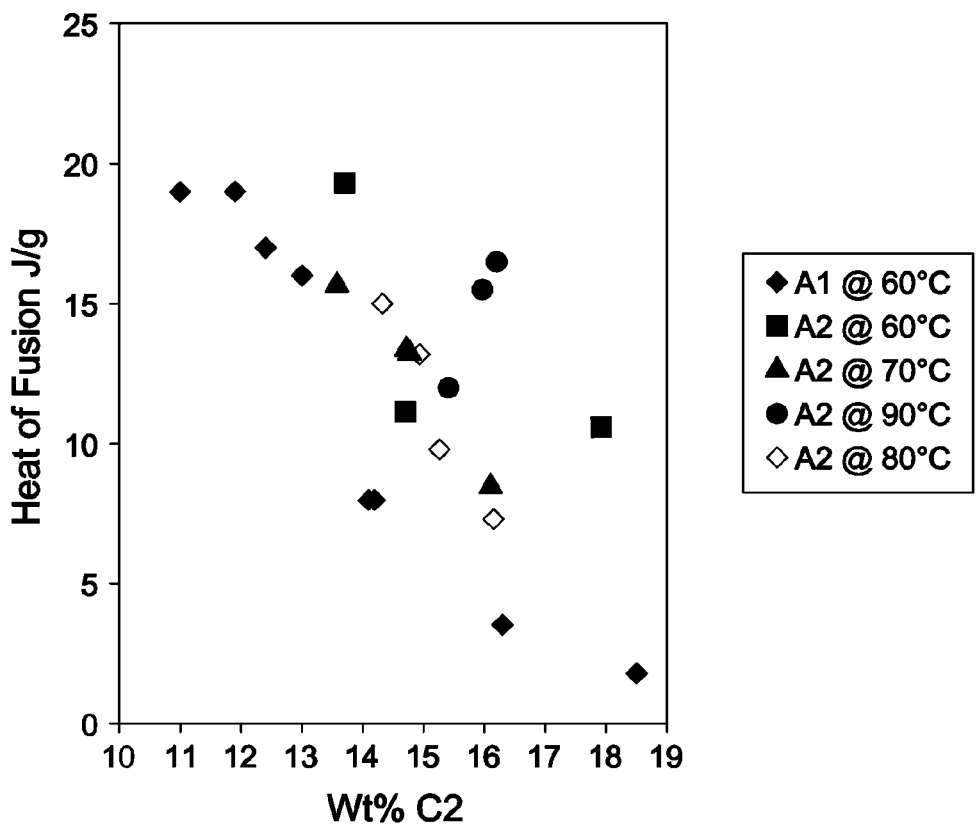
FIG. 5 is a plot of heat of fusion in J/g as a function of ethylene content and polymerization temperature for samples prepared using the process of the invention and comparative samples.

Samples 55 Through 68 and 69-C Through 76-C (Comparative):

The heat of fusion data for the polymers of examples 55 through 68 and the data for the comparative examples 69-C to 76-C is plotted in FIG. 5 which shows that the activators of the invention have an ability to make a polymer of a higher crystallinity than the comparative examples.

Samples 77-C Through 80-C (Comparative):

Comparative examples 77-C to 80-C show the comparison of the Mooney viscosity (Mooney viscosity measured as ML (1+4) at 127° C. in Mooney units according to ASTM D-1646) of the polymer made with A1 for comparison to the data in examples 55 through 68. Since the Mooney viscosity of the copolymers is strongly dependent on the steady sate

TABLE 11

Polymerization Conditions and Polymer Products

| | | Polymerization Reactor | | | | | | Polymer | | |
|---|---|---|---|---|---|---|---|---|---|---|
| | | | Hexane | | | Polymer | Steady | | | |
| Sample # | NCA | Temp (° C.) | Solvent (kg/hr) | Ethylene (g/hr) | Propylene (g/hr) | Product (kg/hr) | State $C_3^=$ (mole/l) | $C_2^=$ wt % | Mw (x1000) | Tm (° C.) | $H_f$ (J/g) |
| 47C | A1 | 50 | 3.56 | 45 | 438 | 0.31 | 0.66 | 14.9 | 113 | 43 | 6.3 |
| 48C | A1 | 65 | 3.56 | 45 | 438 | 0.30 | 0.68 | 15.2 | 86 | 44 | 0.7 |
| 49C | A1 | 80 | 3.56 | 45 | 438 | 0.29 | 0.70 | 15.0 | 67 | no | na |
| 50C | A1 | 95 | 3.56 | 45 | 438 | 0.30 | 0.69 | 15.3 | 33 | no | na |
| 51 | A2 | 50 | 3.56 | 45 | 438 | 0.31 | 0.65 | 14.0 | 245 | 43 | 17 |
| 52 | A2 | 65 | 3.56 | 45 | 438 | 0.30 | 0.68 | 15.0 | 208 | 44 | 13 |
| 53 | A2 | 80 | 3.56 | 45 | 438 | 0.29 | 0.71 | 15.5 | 142 | 46 | 9.1 |
| 54 | A2 | 95 | 3.56 | 45 | 438 | 0.30 | 0.69 | 15.3 | 91 | 47 | 2.8 |

Figure 6:
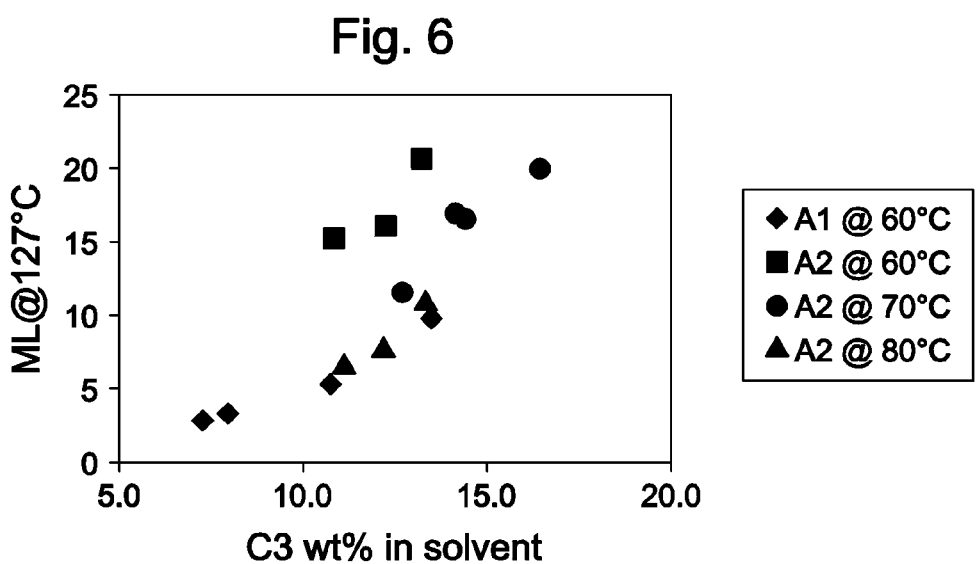
FIG. 6 is a plot of the Mooney (ML127C) as a function of propylene content in hexane solvent in weight percent and polymerization temperature for the copolymers of the current invention and comparative samples.

Samples 47-C Through 50-C (Comparative) and 51 Through 54:

In these examples similar data is shown for propylene ethylene polymers containing isotactic propylene crystallinity which have the polymerization conducted at a higher steady state propylene concentration than those reported previously above.

monomer concentrations the data is plotted as a function of the monomer concentration and the polymerization temperature. The data demonstrates that the copolymers made with A1 have a lower Mooney viscosity than those made with A2 at similar or higher polymerization temperature. This is shown in FIG. 6.

TABLE 12

Polymerization Conditions and Polymer Products

| | | Polymerization Reactor | | | | | | | Polymer | | |
|---|---|---|---|---|---|---|---|---|---|---|---|
| | | | Hexane | | | Polymer | Steady State | | | | |
| Sample # | NCA | Temp (° C.) | Solvent (kg/hr) | Ethylene (g/hr) | Propylene (g/hr) | Product (kg/hr) | $C_3^=$ wt % in Hexane | $C_2^=$ wt % | ML@127° C. | Tm (° C.) | $H_f$ (J/g) |
| 19 | A2 | 60 | 3.56 | 75 | 812 | 0.49 | 10.8 | 13.70 | 15.3 | 45 | 19.3 |
| 20 | A2 | 60 | 3.56 | 75 | 812 | 0.44 | 12.3 | 14.70 | 16.1 | 46 | 11.14 |
| 21 | A2 | 60 | 3.56 | 75 | 812 | 0.41 | 13.2 | 17.92 | 20.6 | 46 | 10.6 |
| 22 | A2 | 70 | 3.56 | 75 | 812 | 0.43 | 12.7 | 16.10 | 11.6 | 47 | 8.6 |
| 23 | A2 | 70 | 3.56 | 65 | 812 | 0.35 | 14.5 | 14.70 | 16.6 | 46 | 13.5 |
| 24 | A2 | 70 | 3.56 | 60 | 812 | 0.36 | 14.1 | 13.57 | 16.9 | 46 | 15.8 |
| 24 | A2 | 70 | 3.56 | 58 | 812 | 0.26 | 16.4 | 14.76 | 19.9 | 46 | 13.4 |
| 26 | A2 | 80 | 3.56 | 75 | 812 | 0.50 | 11.1 | 16.20 | 6.7 | 45 | 16.5 |
| 27 | A2 | 80 | 3.56 | 70 | 812 | 0.45 | 12.2 | 15.97 | 7.9 | 45 | 15.5 |
| 28 | A2 | 80 | 3.56 | 70 | 812 | 0.40 | 13.3 | 15.41 | 11 | 46 | 12 |
| 29 | A2 | 90 | 3.56 | 75 | 812 | 0.49 | 11.1 | 14.32 | 4.1 | 46 | 15 |
| 30 | A2 | 90 | 3.56 | 75 | 812 | 0.41 | 13.2 | 16.15 | 4.8 | 49 | 7.3 |
| 31 | A2 | 90 | 3.56 | 67 | 812 | 0.36 | 14.2 | 14.94 | 5.2 | 46 | 13.2 |
| 32 | A2 | 90 | 3.56 | 60 | 812 | 0.28 | 16.0 | 15.26 | 6.6 | 46 | 9.8 |

TABLE 13

Polymer Products

| Sample # | NCA | Polymer C$_2^=$ wt % | Tm (° C.) | H$_f$ (J/g) |
|---|---|---|---|---|
| 69-C | A1 | 11 | 45 | 19 |
| 70-C | A1 | 11.9 | 46 | 19 |
| 71-C | A1 | 12.4 | 46 | 17 |
| 72-C | A1 | 13 | 47 | 16 |
| 73-C | A1 | 14.1 | 46 | 8 |
| 74-C | A1 | 14.2 | 46 | 8 |
| 75-C | A1 | 16.3 | 46 | 3.5 |
| 76-C | A1 | 18.5 | 45 | 1.8 |

TABLE 14

Polymerization Conditions and Polymer Products

| Sample # | NCA | Polymerization Reactor | | | | | Polymer | | |
|---|---|---|---|---|---|---|---|---|---|
| | | Temp (° C.) | Hexane Solvent (kg/hr) | Ethylene (g/hr) | Propylene (g/hr) | Polymer Product (kg/hr) | Steady State C$_3^=$ wt % in C6 | C$_2$ wt % | ML@127° C. |
| 77-C | A1 | 60 | 3.56 | 75 | 812 | 0.49 | 10.8 | 12.83 | 2.8 |
| 78-C | A1 | 60 | 3.56 | 75 | 812 | 0.44 | 12.3 | 11.54 | 3.3 |
| 79-C | A1 | 60 | 3.56 | 75 | 812 | 0.41 | 13.2 | 12.31 | 5.4 |
| 80-C | A1 | 60 | 3.56 | 75 | 812 | 0.43 | 12.7 | 14.63 | 9.8 |

Although the present invention has been described in considerable detail with reference to certain aspects and embodiments thereof, other aspects and embodiments are possible. For example, while ethylene propylene copolymers have been exemplified, other copolymers are also contemplated. Therefore, the spirit and scope of the appended claims should not be limited to the description of the versions contained herein.

Certain features of the present invention are described in terms of a set of numerical upper limits and a set of numerical lower limits. It should be appreciated that ranges from any lower limit to any upper limit are within the scope of the invention unless otherwise indicated.

All patents, test procedures, and other documents cited in this application are fully incorporated by reference to the extent such disclosure is not inconsistent with this application and for all jurisdictions in which such incorporation is permitted.

What is claimed is:

1. A copolymer prepared by a process comprising:
   a) polymerizing propylene and ethylene comonomers in a solution process at a reaction temperature at or above 60° C., with a polymerization catalyst complex comprising:
      i) an organometallic Group 4 transition metal compound; and
      ii) an activating cocatalyst, wherein said catalyst complex is capable of producing stereospecific polypropylene; and
   b) recovering the propylene copolymer,
   wherein the copolymer comprises units derived from propylene in an amount greater than or equal to 75 weight percent, and units derived from ethylene in an amount of from 5 to 25 weight percent, and
   wherein the copolymer has
      (i) a melting point of from greater than 35° C. to less than 110° C.,
      (ii) a weight average molecular weight of:

$$Mw > 6.10 * P * e^{(3370/T)}$$

wherein:
      Mw = the weight average molecular weight
      T = the polymerization reaction temperature in degrees Kelvin
      P = the steady state propylene concentration in the polymerization reaction zone in moles per liter, and
      (iii) an elongation of greater than 1000%.

2. The copolymer of claim 1 comprising units derived from propylene in an amount of from 80 to 90 weight percent.

3. The copolymer of claim 1 comprising units derived from ethylene in an amount of from 10 to 25 weight percent.

4. The copolymer of claim 1 wherein the reaction temperature is in a range of 60° C. to 200° C.

5. The copolymer of claim 1 having a melting point of from less than 90° C. to greater than 40° C.

6. The copolymer of claim 1 having a heat of fusion of greater than 1.0 J/g to less than 75 J/g.

7. The copolymer of claim 1 wherein said organometallic Group 4 transition metal compound comprises two cyclopentadienyl ligands covalently bridged by a substituted or unsubstituted carbon atom or a substituted or unsubstituted silicon atom, wherein said Group 4 transition metal compound is chiral.

8. The copolymer of claim 7 wherein said bridge atom is substituted with at least one methyl group.

9. The copolymer of claim 7 wherein said cyclopentadienyl ligands are indenyl.

10. A composition comprising the copolymer of claim 1.

11. A copolymer prepared by a process comprising:
   a) polymerizing propylene and ethylene comonomers in a solution process at a reaction temperature at or above 60° C., with a polymerization catalyst complex comprising:
      i) an organometallic Group 4 transition metal compound; and
      ii) an activating cocatalyst, precursor ionic compound comprising a halogenated tetra-aryl-substituted Group 13 anion wherein each aryl substituent contains at least two cyclic aromatic rings,
      wherein said catalyst complex is capable of producing stereospecific polypropylene; and
   b) recovering the copolymer,
   wherein the copolymer comprises units derived from propylene in an amount greater than or equal to 75 weight percent, and units derived from ethylene in an amount of from 5 to 25 weight percent, and wherein the copolymer has
(i) a melting point of from greater than 35° C. to less than 110° C.,
(ii) a weight average molecular weight of:

$$Mw > 6.10 * P * e^{(3370/T)}$$

wherein:
Mw=the weight average molecular weight
T=the polymerization reaction temperature in degrees Kelvin
P=the steady state propylene concentration in the polymerization reaction zone in moles per liter, and
(iii) a tensile strength greater than 300 psi.

12. The copolymer of claim 11 comprising units derived from propylene in an amount of from 80 to 90 weight percent.

13. The copolymer of claim 11 comprising units derived from ethylene in an amount of from 10 to 25 weight percent.

14. The copolymer of claim 11 having a melting point of from less than 90° C. to greater than 40° C.

15. The copolymer of claim 11 having a heat of fusion of greater than 4.0 J/g to less than 30 J/g.

16. The copolymer of claim 11 wherein said organometallic Group 4 transition metal compound comprises two cyclopentadienyl ligands covalently bridged by a substituted or unsubstituted carbon atom or a substituted or unsubstituted silicon atom, wherein said Group 4 transition metal compound is chiral.

* * * * *